United States Patent
Benson et al.

(10) Patent No.: US 12,418,573 B2
(45) Date of Patent: *Sep. 16, 2025

(54) SYSTEM AND METHOD FOR QUEUED AND TIMED ONE-ON-ONE VIDEO CONFERENCE CALLS

(71) Applicant: SQQ Inc, Astoria, NY (US)

(72) Inventors: Dave Benson, Astoria, NY (US); Jonathan Warnock, New York, NY (US)

(73) Assignee: SQQ Inc, Astoria, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/601,699

(22) Filed: Mar. 11, 2024

(65) Prior Publication Data

US 2025/0023933 A1    Jan. 16, 2025

Related U.S. Application Data

(63) Continuation of application No. 17/738,275, filed on May 6, 2022, now Pat. No. 11,962,629, which is a continuation-in-part of application No. 17/556,629, filed on Dec. 20, 2021, now Pat. No. 11,722,637, which is a continuation of application No. 17/196,687, filed on Mar. 9, 2021, now Pat. No. 11,240,467.

(51) Int. Cl.
*H04L 65/403* (2022.01)
*H04L 65/1093* (2022.01)
*H04L 65/401* (2022.01)

(52) U.S. Cl.
CPC ........ *H04L 65/403* (2013.01); *H04L 65/1093* (2013.01); *H04L 65/401* (2022.05)

(58) Field of Classification Search
None
See application file for complete search history.

(56) References Cited

U.S. PATENT DOCUMENTS

| | | | |
|---|---|---|---|
| 9,148,702 B1 * | 9/2015 | Ko | H04N 21/47214 |
| 10,423,318 B1 * | 9/2019 | Ko | H04L 65/60 |
| 11,575,720 B2 * | 2/2023 | Han | H04N 7/15 |
| 2005/0053214 A1 * | 3/2005 | Reding | H04M 3/387 |
| | | | 379/202.01 |
| 2023/0144781 A1 * | 5/2023 | Han | H04L 65/4015 |
| | | | 709/204 |

* cited by examiner

*Primary Examiner* — Quang N Nguyen
(74) *Attorney, Agent, or Firm* — Meister Seelig & Fein PLLC

(57) ABSTRACT

A method for facilitating a timed video call comprising receiving a request from a host on a first user device to initiate a timed video call with one or more guests on one or more second user devices, the request including a configuration for a queue, wherein the queue determines an order and time for the one or more guests to speak during the timed video call, and streaming video and audio between the first user device and a given one of the one or more second user devices based on the queue, the streamed video and audio rendered on a call interface, the call interface comprising a timer ribbon including a host portion indicator corresponding to a first length of time, a guest portion indicator corresponding to a second length of time, and an indicator for a next one of the one or more guests on the queue.

31 Claims, 34 Drawing Sheets

SYSTEM AND METHOD FOR QUEUED AND TIMED ONE-ON-ONE VIDEO CONFERENCE CALLS

CROSS REFERENCE TO RELATED APPLICATIONS

This application is a continuation of U.S. patent application Ser. No. 17/738,275 filed on May 6, 2022, entitled "SYSTEM AND METHOD FOR A TIMED ONE-ON-ONE VIDEO CONFERENCE CALL," which is a continuation-in-part of U.S. patent application Ser. No. 17/556,629 filed on Dec. 20, 2021 (now U.S. Pat. No. 11,722,637 issued on Aug. 8, 2023), entitled "SYSTEM AND METHOD FOR A TIMED ONE-ON-ONE VIDEO CONFERENCE CALL," which is a continuation of U.S. patent application Ser. No. 17/196,687 filed on Mar. 9, 2021 (now U.S. Pat. No. 11,240,467 issued on Feb. 1, 2022), entitled "SYSTEM AND METHOD FOR A TIMED ONE-ON-ONE VIDEO CONFERENCE CALL," the disclosures of which are hereby incorporated by reference in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to a system and method for a timed one-on-one video conference all and, more specifically, to a timed one-on-one video conference call.

DESCRIPTION OF THE RELATED ART

Communication is shifting from in-person chats to written communication and virtual conferencing. Virtual conferencing may include collaborative communication sessions that are established between communication devices across a communications network. Information shared during virtual conferencing may include video, audio, chat, and/or other digital content. During a virtual conference, a participant may raise a query that requires answering or addressing by a given subject matter expert. However, when participants are connected via a virtual meeting, the ability to detect when a person wants "floor control" or the ability to control who speaks is limited during a virtual meeting in a virtual environment.

What is needed is a new video conference call system and method that addresses the above-mentioned issues.

SUMMARY OF THE INVENTION

In an effort to address the above-described needs, a system and method for a timed one-on-one video conference call are disclosed. In some embodiments, a computer-implemented method for a timed one-on-one video conference call is provided. The computer implemented method comprising receiving over a communication network a request from a host on a first user device to initiate a timed one-on-one video conference call with a guest on a second user device, the request by the host including identification information for the guest on the second user device, initiating a timed one-on-one video conference call between the host on the first user device and the guest on the second user device, transmitting over the communication network to the host on the first user device and to the guest on the second user device a link or invitation to participate in the timed one-on-one video conference call initiated in response to the request by the host, receiving over the communication network a response to the link or invitation from the host on the first user device, transmitting over the communication network a shared lobby interface to be rendered on the first user device of the host, the shared lobby interface comprising a join button and text reciting one or more topical suggestions, receiving over the communication network a response to the link or invitation from the guest on the second user device, transmitting over the communication network the shared lobby interface to be rendered on the second user device of the guest, the shared lobby interface comprising a join button and text reciting one or more topical suggestions, receiving over the communication network an interaction with the join button from both the host on the first user device and the guest on the second user device, transmitting over the communication network a shared conference call interface to be rendered on both the first user device of the host and the second user device of the guest, the shared conference call interface comprised of a video stream and an audio stream received over the communication network from both the host on the first user device and the guest on the second user device and a timer ribbon, the timer ribbon defining a question portion and an answer portion, initiating a timer to provide a count from zero and up to a total length of time, and updating over the communication network the timer ribbon within the shared conference call interface according to the count of the timer, the first length of time and the second length of time adding up to the total length of time of the timer.

Still, other aspects, features, and advantages of this disclosure may be readily apparent from the following detailed description, as illustrated by several example embodiments. This disclosure may also be capable of other and different embodiments, and its several details may be modified in various respects. Accordingly, the drawings and descriptions are to be regarded as illustrative and not as restrictive.

The present invention provides a method and system for facilitating a timed video call. According to one embodiment, the method comprises receiving over a communication network a request from a host on a first user device to initiate a timed video call with one or more guests on one or more second user devices, wherein the request comprises a message including queue configuration data. The queue configuration data may include a configuration for a queue for the timed video call wherein the queue determines an order and time for the one or more guests to speak during the timed video call. A link or invitation to participate in the timed video call is transmitted over the communication network to the host on the first user device and the one or more guests on the one or more second user devices. The method further comprises receiving over the communication network a command to join the timed video call from the host on the first user device and the one or more guests on the one or more second user devices via the link or invitation and streaming video and audio between the host on the first user device and a given one of the one or more guests on a given one of the one or more second user devices based on the queue. The streamed video and audio are rendered on a call interface on the first user device of the host and on the given one of the second user devices of the given one of the guests. The call interface comprises a timer ribbon including a host portion indicator corresponding to a first length of time, a guest portion indicator corresponding to a second length of time, and an indicator for a next one of the one or more guests on the queue.

The queue may comprise a data structure storing include time blocks for the one or more guests. The time blocks may be assigned to the one or more guests by the host or selected by the one or more guests. Queues may be created according to a variety of templates for different queue configurations, or fields that are set based on queue configuration data. The configuration for the queue may further comprise time increments for generating the time blocks based on a total number of guests or desired questions. The configuration for the queue may further comprise a private queue configuration allowing for the host and one guest to participate in and view the timed video call at a given time block. The configuration for the queue may further comprise a public queue configuration allowing for the host and a plurality of guests to view an entirety of the timed video call wherein a designated guest is allowed to speak with the host during a given time block.

The timed video call may be split into separate sessions comprising breakout rooms by dynamically generating new sessions based on one or more parameters of the timed video call and assign participants from the timed video call to each of the new sessions. Participants for the breakout rooms may be chosen randomly or by the host on the first user device. The method may further comprise integrating a feature to initiate the timed video call into a third-party platform or website. The third-party platform or website may comprise a sports betting website, a dating website, a financial services platform, an education technology platform, or a retail brand website.

In certain embodiments, a timed video call may be generated with a type or purpose field which may be provided in a request to initiate the timed one-on-one video conference call. The type or purpose field may be used to show the host and guest on a call interface the nature of the call as well as configure certain settings of the timed video call, such as length, privacy settings etc. In one embodiment, the timed video call may include a type or purpose field including at least one of a sales pitch, checking in with staff to facilitate regular contact, brief reporting on project statuses, critiquing of design and marketing projects. In another embodiment, the timed video call may include a type or purpose field including a doctor-to-doctor consultation. In other embodiments, the timed video call may include a type or purpose field including customer service questioning and answering, anonymous suggestions, an online challenge, and a solicitation of advice. A total of the first length of time and the second length of time may comprise a minute. A duration of the timed video call may be preconfigured for a specific duration of time.

According to one embodiment, the system comprises a processor and a memory having executable instructions stored thereon that when executed by the processor cause the processor to receive over a communication network a request from a host on a first user device to initiate a timed video call with one or more guests on one or more second user devices. The request may comprise a message including queue configuration data. The queue configuration data may include a configuration for a queue for the timed video call wherein the queue determines an order and time for the one or more guests to speak during the timed video call. The processor may be further configured to transmit over the communication network to the host on the first user device and the one or more guests on the one or more second user devices a link or invitation to participate in the timed video call, receive over the communication network a command to join the timed video call from the host on the first user device and the one or more guests on the one or more second user devices, and stream video and audio between the host on the first user device and a given one of the one or more guests on a given one of the one or more second user devices based on the queue. The streamed video and audio may be rendered on a call interface on the first user device of the host and on the given one of the second user devices of the given one of the guests. The call interface may comprise a timer ribbon including a host portion indicator corresponding to a first length of time, a guest portion indicator corresponding to a second length of time, and an indicator for a next one of the one or more guests on the queue.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
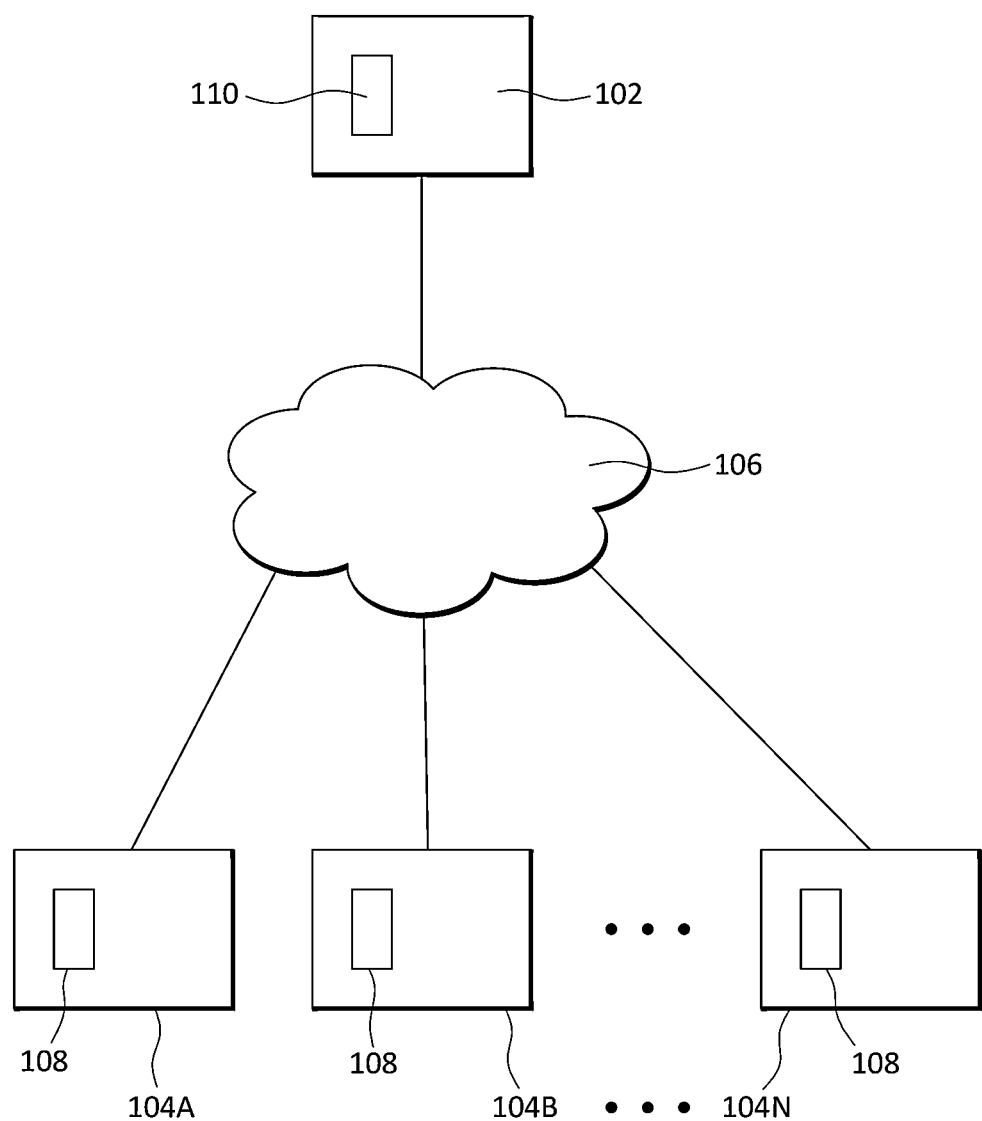
FIG. 1 illustrates an exemplary high-level system architecture for providing a timed one-on-one video conference call according to an implementation disclosed herein.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The presently disclosed system and method provides fostering of creative collaboration between two or more people and frees up time (rather than being stuck in never-ending meetings). Most meetings can be wasteful and inefficient. Too many meetings and not enough free time may lead to burnout. Additionally, as remote work has become prevalent, people miss running into colleagues and having spontaneous chats about work or otherwise. Solitude and perpetually open-ended items may cause frustration, low morale, and people quitting their jobs in record numbers.

The present application discloses a system and method for creating short duration video conferences between two or more user devices to provide productivity and collaborative benefits. The disclosed system generates short duration video conferences that allow for quick and concise conversations. The short duration video conferences may guide the participants to an answer or resolution in a relatively short amount of time compared to that of traditional conferences. According to embodiments of the present invention, the disclosed system may comprise a server configured to host live one-on-one video conferences having a time limit (e.g., 60-seconds) to help encourage more productive conversations, eliminate unnecessary meetings, reclaim people's calendars, and increase the speed of problem-solving. The disclosed one-on-one video conferences may help to replace desk drop-bys, office pop-ins, and other "collision" meetings.

FIG. 1 presents an exemplary high-level system architecture 100 for providing a timed one-on-one video conference call according to an implementation disclosed herein. The system architecture 100 comprises a communication server 102 connected to user devices 104A-N by a communication network 106. Each of the user devices 104A-N is capable of implementing a client application 108 for a timed one-on-one video conference call that is limited to a predetermined duration, e.g., 60 seconds. The client application 108 may provide shared interfaces received from the communication server 102 in which video and audio streams are embedded, the video and audio streams originating from the user devices 104A-N. Specifically, video and audio streams may originate from a first user device 104A of a host and from a second user device 104B of a guest, the host and guest participating in a timed one-on-one video conference call over the communication network 106 as implemented by the communication server 102.

The user devices 104A-N may include a smartphone, tablet, laptop, desktop, palmtop, television, or any other computing device configured to execute the functionality described herein. The user devices 104A-N may have output functionality (e.g., display monitor, touchscreen, speaker, etc.) and input functionality (e.g., touchscreen, keyboard, mouse, camera, microphone, etc.). A camera may provide a video stream on each of the user devices 104A-N, and a microphone may provide an audio stream on each of the user devices 104A-N.

The client application 108 may be a timed one-on-one video conference call client application implemented as a native application, web application, or other software forms. In some implementations, the client application 108 is in the form of a web page, widget, and/or Java, JavaScript, and/or other applet or plug-in that is downloadable to each of the user devices 104A-N and runs in conjunction with a web browser. The client application 108 and the web browser can be part of a single client-server interface; for example, the client application 108 can be implemented as a plugin to the web browser or another framework or operating system. Any other suitable client software architecture, including but not limited to a widget framework and applet technology, can also be employed.

The communication server 102 may be capable of implementing a server side application 110 for a timed one-on-one video conference call that includes sharing interfaces with embedded video and audio streams received from the user devices 104A-N.

The communication server 102 may be embodied as a computer or computers as reasonably known in the art. The communication server 102 may receive and transmit electronic data from various sources, including but not limited to the user devices 104A-N. For example, the communication server 102 may be operable to receive and post or transmit shared interfaces with embedded video and audio streams originating from one or more of the user devices 104 to one or more other ones of the user devices 104. The communication server 102 may further comprise a database that stores data, such as user accounts or registered users, preferences, rules, and queue data.

The server side application 110 may also provide for a conference call timer that enables the differentiation between different portions of a conference call and the determination of a total length of a conference call. The server side application 110 may update the shared interfaces based on the status of the conference call timer.

The user devices 104A-N, via the communication server 102 and/or other devices and servers, may communicate with each other through the communication network 106. Transmissions over the communication network 106 can take place via any media such as standard telephone lines, LAN or WAN links (e.g., T1, T3, 56kb, X.25), and broadband connections (ISDN, Frame Relay, ATM), wireless links (802.11, Bluetooth, GSM, CDMA, etc.). The communication network 106 can carry TCP/IP protocol communications and HTTP/HTTPS requests made by a web browser, and the connection between clients and servers can be communicated over such TCP/IP networks. The type of communication network is not limited, however, and any suitable network can be used.

More generally, the techniques described herein can be implemented in any suitable hardware or software. If implemented as software, the processes can be executed on a system capable of running one or more custom operating systems or any commercially available operating system. The software can be implemented on a computer, including a processor unit, system memory, and a system bus that interconnects various components, including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. An apparatus of the invention can also perform method steps implemented as a particular purpose logic circuitry, including, as an example, a field-programmable gate array (FPGA) or an application-specific integrated circuit (ASIC). Modules can refer to portions of the computer program and/or the processor/special circuitry that implements that functionality.

Processors suitable for executing a computer program include, by way of example, both general and special purpose microprocessors and any one or more processors of any digital computer. Generally, a processor will receive instructions and data from a read-only memory or a random-access memory, or both. The essential elements of a computer are a processor for executing instructions and one or more memory devices for storing instructions and data. Information carriers suitable for embodying computer program instructions and data include all forms on non-volatile memory, including by way of example semiconductor memory devices, e.g., EPROM, EEPROM, and flash memory devices; magnetic disks, e.g., internal hard disks or removable disks; magnetic disks, e.g., internal hard disks or removable disks; magnetic-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The programs can be further translated into machine language or virtual machine instructions and stored in a program file form. The program file can then be stored on or in one of the articles of manufacture.

Figure 2:
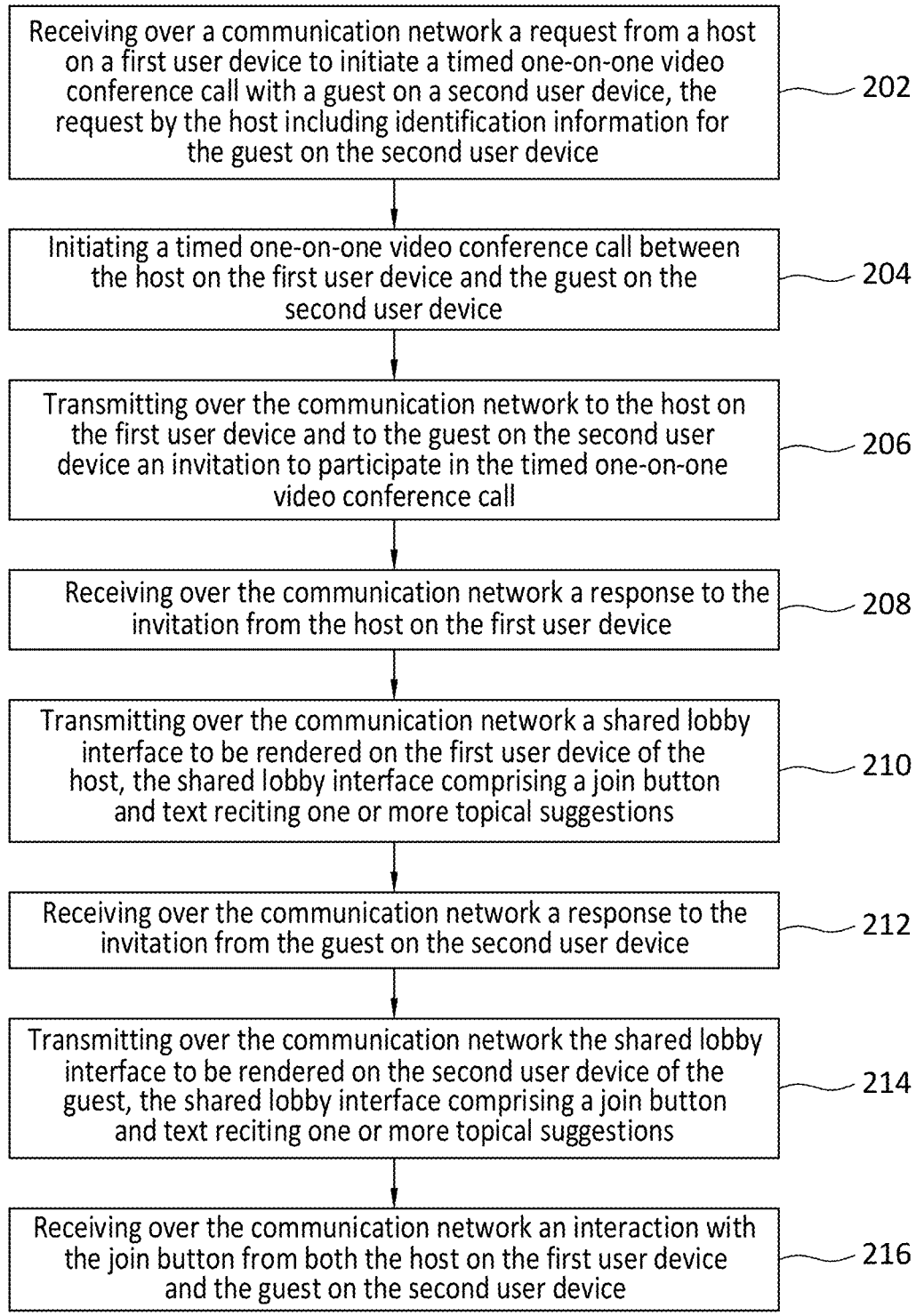
FIG. 2 illustrates a flowchart of a computer-implemented application that provides for a timed one-on-one video conference call according to an implementation disclosed herein.
Figure 2:
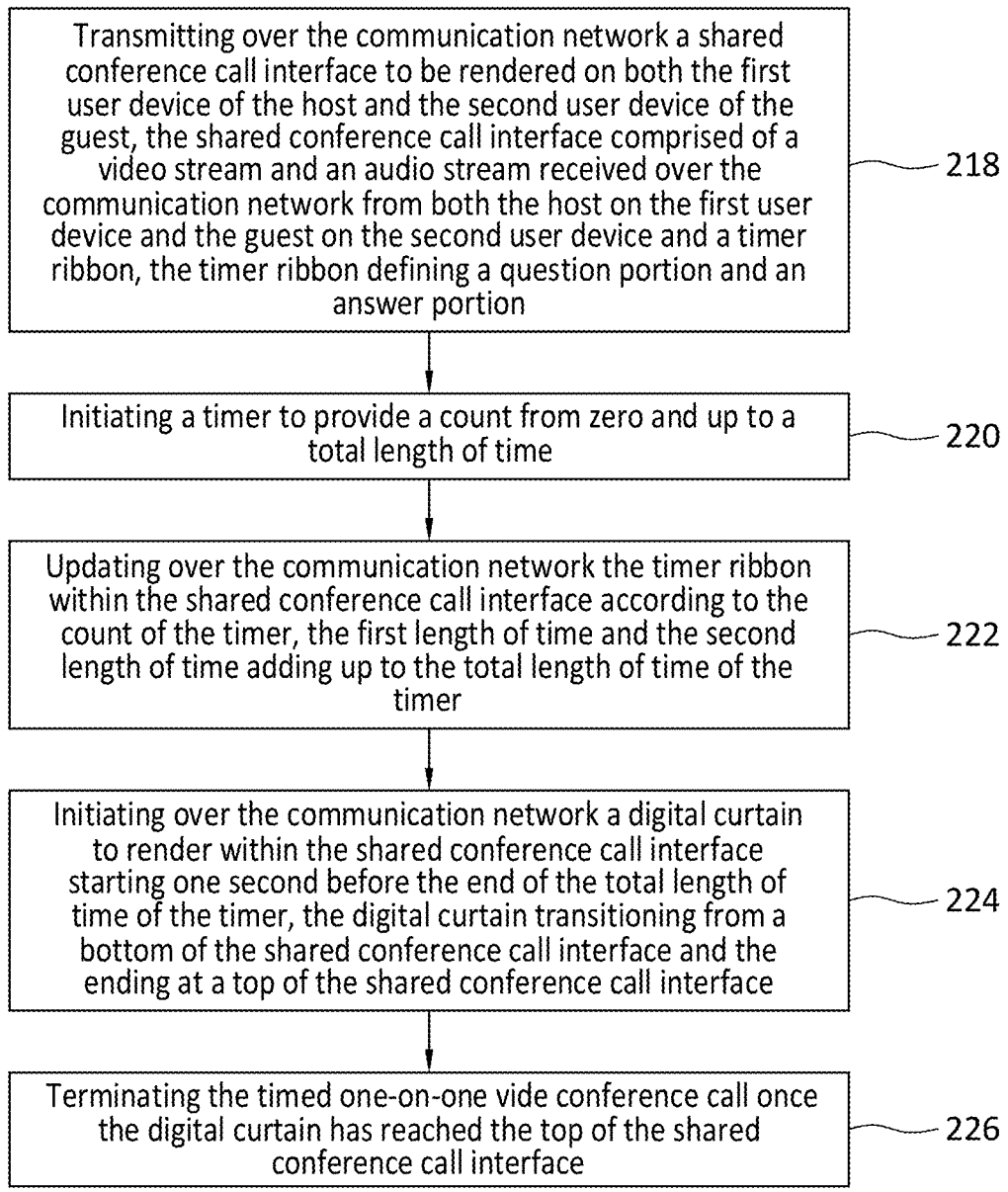

FIG. 2 presents a flowchart of a computer-implemented application that provides for a timed one-on-one video conference call according to an implementation disclosed herein.

The method 200 begins at step 202 with communication server 102 receiving over a communication network 106 a request from a host on a first user device 104A to initiate a timed one-on-one video conference call with a guest on a second user device 104B, the request by the host may comprise a message including identification information for the guest on the second user device 104B. The identification information of the guest on the second user device 104B may include a name, email address, username, phone number, or any other identifying information reasonably known to one of ordinary skill in the art. The identification information may also have been previously gathered and stored on the database of communication server 102. The request may further include a proposed date and time for scheduling the timed one-on-one video conference call in advance or alternatively, to start as soon as possible (e.g., upon response by the guest). The request may also include configuration settings for the timed one-one-one video conference call, such as a queue that determines an order and time for one or more guests to participate in the timed one-on-one video conference call. Details or information in the request may be parsed for creating the timed one-on-one video conference call. Additionally, one or more data entries may be created for each timed one-on-one video conference call in the database of communication server 102 for managing timed one-on-one video conference call sessions.

According to another embodiment, the host on the first user device 104A may create a timed one-on-one video conference call with a group of guests on user devices 104B-104N. A queue may be created for the group of guests wherein specific time blocks of a queue may be assigned to by the host or selected by guests. The queue may be created as a data object and stored as a record associated with the timed one-on-one video conference call in the database coupled to the communication server 102. The queue may determine an order and time for the guests to speak during the timed one-on-one video conference call.

Queues may be created according to a variety of templates for different queue configurations, or fields that are set based on queue configuration data. The host may select time increments for creating time blocks in the queue based on a total number of guests or desired questions (e.g., 15 minutes=15 guests). Each time block may correspond to individual one-on-one timed video conference call sessions. The host may further configure whether the queue is private or public.

A private queue may comprise one or more single-host-to-single-guest sessions which allows for only the host and one guest to participate in and view the timed one-on-one video conference call at a given time block. A public queue may comprise a single-host-to-many-guests session where all participants are able to view an entirety of the timed one-on-one video conference call but only a designated guest is allowed to carry a dialogue with the host during their assigned time block.

Once the request has been received over the communication network 106 from the host on the first user device 104A, the method 200 continues in step 204 with initiating a timed one-on-one video conference call between the host on the first user device 104A and the guest on the second user device 104B. Prior to initiating the timed one-on-one video conference call, authentication on the communication server 102 of the host on the first user device 104A, the guest on the second user device 104B, or both may be required. This authentication may be implemented on the communication server 102 by any means reasonably known to one of ordinary skill in the art.

Once the timed one-on-one video conference call has been initiated on the communication server 106, the method 200 continues in step 206 with transmitting over the communication network 106 to the host on the first user device 104A and to the guest on the second user device 104B, a link or invitation to participate in the timed one-on-one video conference call. In an exemplary implementation, the link or invitation may include a link that will link the first user device 104A and the second user device 104B to a corresponding timed one-on-one video conference call referenced in the database of the communication server 102 over the communication network 106 when engaged by the user and the guest. The link may be provided by a "copy to clipboard" feature or sent via email, Short Message Service ("SMS"), or shared by other forms of electronic communications. According to another embodiment, the link or invitation may comprise a calendar invite for scheduling the timed one-on-one video conference call for a later time. The calendar invite may be available via an application programming interface ("API"), and/or through integrations with calendar applications such as Google Calendar and Calendly. For example, functionality for inviting guests to timed one-on-one video conference calls may be integrated into an invite button on a calendar application.

Once the link or invitation has been transmitted over the communication network 106, the method 200 continues in step 208 with receiving over the communication network 106 a response to the link or invitation from the host on the first user device 104A. In an exemplary implementation, the received response may be in response to the host engaging the link or invitation received on the first user device 104A upon initiating the timed one-on-one video conference call. The response from the host is received over the communication network 106, and the method 200 continues in step 210 with transmitting over the communication network 106 a shared lobby interface to be rendered on the first user device 104A of the host, the shared lobby interface comprising a join button and text reciting one or more topical suggestions. The one or more topical suggestions may be selected randomly from a plurality of topical suggestions stored on the communication server 102, each of the plurality of topical suggestions relating to time management, productivity, or work-related suggestions. Alternatively, the topical suggestions may be entered by the host from the first user device 104A.

The method 200 continues in step 212 with receiving over the communication network 106 a response to the link or invitation from the guest on the second user device 104B. In an exemplary implementation, the received responses may be in response to the guest engaging a link included in the invitation received on the second user device 104B. According to one embodiment, the link to the timed one-on-one video conference call may be sent to a plurality of guests, and each guest receiving the link may select the link to be placed into a queue block. Guest may select their time preference and are added to the queue.

Once the response from the guest has been received over the communication network 106, the method 200 continues in step 214 with transmitting over the communication network 106 a shared lobby interface to be rendered on the second user device 104B of the guest, the shared lobby interface comprising a join button and text reciting one or more topical suggestions. According certain embodiments, the response from the guest may be forwarded as a queue request for approval by the host. The queue request may comprise a request to be added to a queue for a timed one-on-one video conference call. The host may approve or deny the request was well as add or remove guests from the queue. Guests that are approved may proceed to render the shared lobby interface on the second user device 104B of the guest. Guests that are denied may not proceed to render the shared lobby interface. Other moderation/validation steps may also be taken before allowing guests to join a timed one-on-one video conference call with the host. The host may also be able to limit queue or timed one-on-one video conference call access at a designated time.

The method 200 continues in step 216 with receiving over the communication network 106, an interaction with the join button from both the host on the first user device 104A and the guest on the second user device 104B. The join button provides a means for the host on the first user device 104A and the guest on the second user device 104B to interact with the communication server 102 from within the shared lobby interface. An interaction by the host or the guest with the communication server 102 using the join button signals over the communication network 106 their respective participation in the timed one-on-one video conference call.

According to one embodiment, the timed one-on-one video conference call may be used in a given company environment or setting, or the host and the guest may share a common affiliation e.g., employees or members of a given company or association. As such, the shared lobby interface may be customized with the name and/or logo of a company or association. The communication server 102 may be provided with data access to enterprise/productivity software via an API and retrieve user account information associated with the host and/or guest. Additionally, the shared lobby interface may include the names of host and guest. For example, the host may be presented with a caption indicating a timed one-on-one video conference call with the name of the guest and a topic, and conversely, the guest may be presented with a caption indicating a timed one-on-one video conference call with the name of the host and the topic.

The shared lobby interface also provides for the selection of a video source and an audio source on each of the user devices 102A-N. Specifically, the shared lobby interface provides for the host to select a camera source and an audio source on the first user device 104A that will provide for a video stream and an audio stream to be used within the timed one-on-one video conference call. Similarly, the shared lobby interface allows the guest to select a camera source and an audio source on the second user device 104B that will provide for a video stream and an audio stream to be used within the timed one-on-one video conference call.

Once an interaction with the join button is received over the communication network 106 from both the host and the guest (or one or more guests), the method 200 continues in step 218 with transmitting over the communication network 106 a shared conference call interface to be rendered on both the first user device 104A of the host and the second user device 104B of the guest to begin the timed one-on-one video conference call. Alternatively, the timed one-on-one video conference call may begin at a scheduled time and date. The shared conference call interface may comprise a video stream and an audio stream received over the communication network 106 from both the host on the first user device 104A and the guest on the second user device 104B and a timer ribbon, the timer ribbon defining a question portion and an answer portion. Each of the question and answer portions of the timer ribbon may be assigned to a host or guest. For example, a host initiating a timed one-on-one video conference call to ask a guest a question may be assigned the question portion of the timer ribbon. According to another embodiment, a host may be assigned to the answer portion of the timer ribbon when the host initiates timed one-on-one video conference calls with guests from a queue (e.g., host takes part in answering questions from one or more guests). For multiple guests, additional invited guests may continue to join the timed one-on-one video conference call as the queue block is progressed through.

The method 200 continues in step 220 with initiating a timer to provide a count from zero and up to a total length of time. The timer may serve as an indication of remaining time left for the timed one-on-one video conference call before a termination of the timed one-on-one video conference call. The duration of the timed one-on-one video conference call may be preconfigured for a specific duration of time, e.g., 60 seconds, two minutes, etc.

Once the timer has started, the method 200 continues in step 222 with updating over the communication network 106 the timer ribbon within the shared conference call interface according to the count of the timer, the timer ribbon indicating a question period for a first length of time and an answer period for a second length of time, the first length of time and the second length of time adding up to the total length of time of the timer.

The method 200 continues in step 224 with initiating over the communication network 106 a digital curtain to render within the shared conference call interface starting at the end of the total length of time of the timer, the digital curtain transitioning from a bottom of the shared conference call interface and the ending at a top of the shared conference call interface.

The method 200 ends in step 226 with terminating the timed one-on-one video conference call once the digital curtain has reached the top of the shared conference call interface. At the end of the timed one-on-one video conference call, a series of questions may be asked of participants to gauge how their user experience was. For example, participants may be asked how was their call quality, what did they love about the timed one-on-one video conference call and/or interface, what was annoying, what was confusing, what did they feel was missing, what did they use the timed one-on-one video conference call for, and generally how may their experience be improved.

Figure 3:
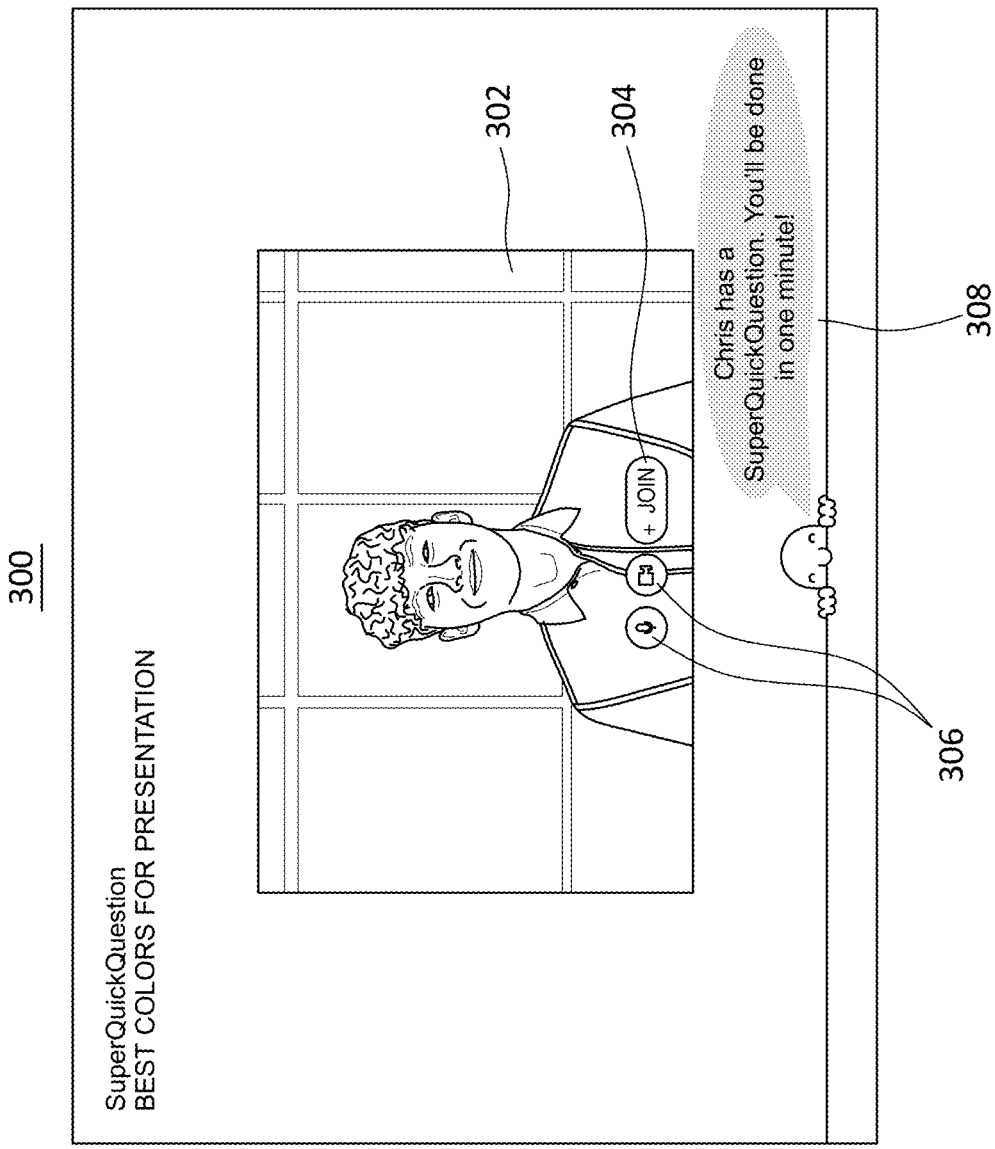
FIG. 3 illustrates an exemplary shared lobby interface for a timed one-on-one video conference call according to an implementation disclosed herein.

FIG. 3 presents an exemplary shared lobby interface 300 for a timed one-on-one video conference call according to an implementation disclosed herein. The shared lobby interface 300 may include a video window 302, a join button 304, video and audio source buttons 306, and text reciting one or more topical suggestions 308.

The video window 302 may display a video stream originating from either the first user device 102A, a video stream originating from the second user device 102B, or a predetermined image file.

As discussed above, the join button 304 may provide for interaction over the communication network 106 by the host on the first user device 102A or the guest on the second user device 102B with the communication server 102 signaling their respective participation in the timed one-on-one video conference call.

The video and audio source buttons 306 provided for selecting a video source and an audio source on the first user device 102A and the second user device 102B. The text reciting one or more topical suggestions 308 may be selected from a plurality of topical suggestions stored on the communication server 102 or entered by the host on the first user device 102A.

Figure 4:
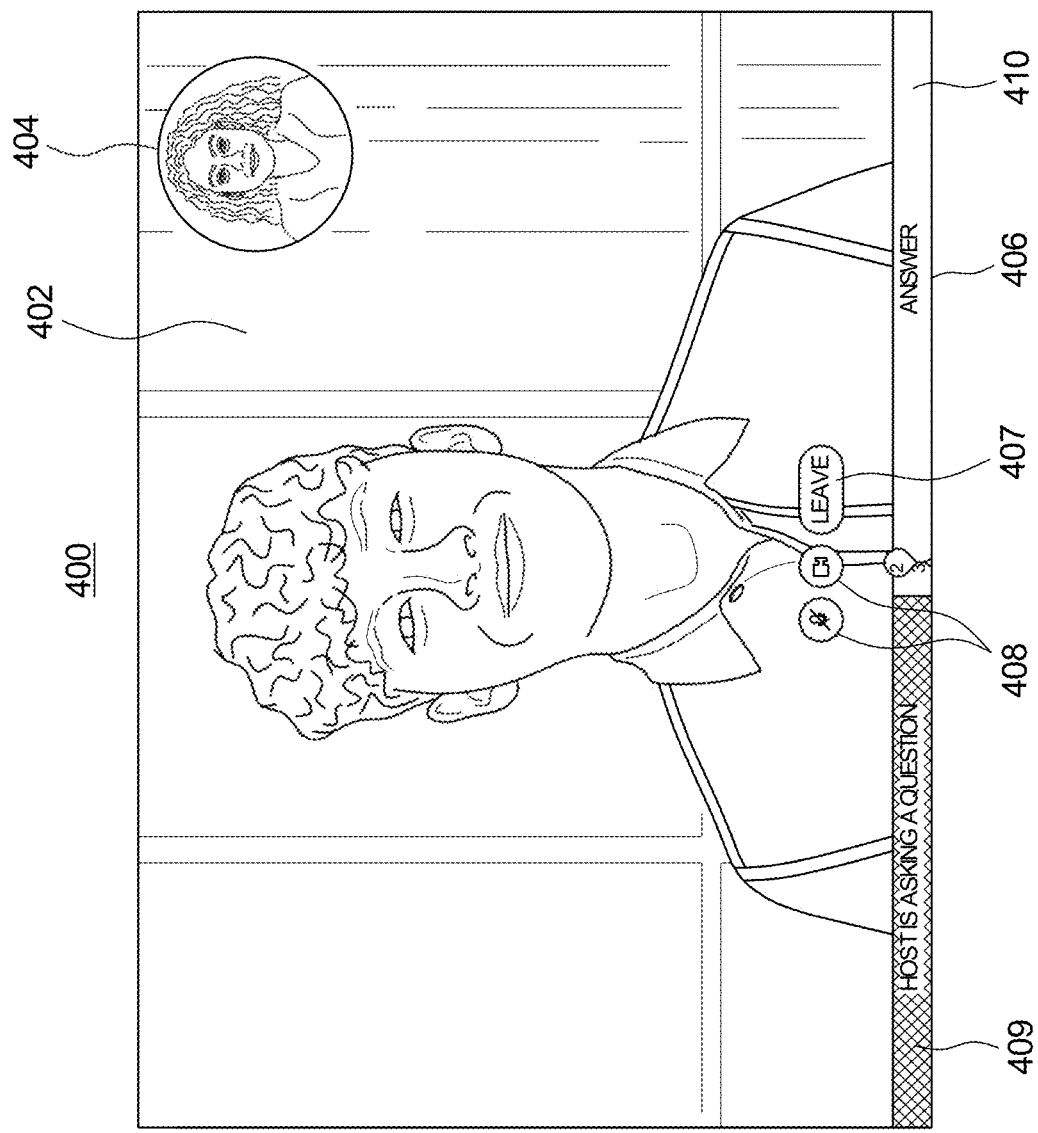
FIG. 4 illustrates an exemplary shared conference call interface for a timed one-on-one video conference call according to an implementation disclosed herein.

FIG. 4 presents an exemplary shared conference call interface 400 for a timed one-on-one video conference call according to an implementation disclosed herein. The shared conference call interface 400 may include a host video window 402, a guest video window 404, a timer ribbon 406, a leave button 407, and video and audio source buttons 408.

The host video window 402 displays the video stream and plays the audio stream originating from the first user device 102A of the host. Similarly, the guest video window 404 displays the video stream and plays the audio stream originating from the second user device 102B of the guest.

The timer ribbon 406 provides a visual display of the timer count up to a total length of time. The timer ribbon 406 may be divided into a question portion 409 and an answer portion 410. While the timer is in the question portion 409, the host video window 402 may be sized to encompass the majority of the shared conference call interface 400 while the guest video window 404 may be sized to encompass a minority of the shared conference call interface 400. Alternatively, while the timer is in the answer portion 410, the guest video window 404 may be sized to encompass the majority of the shared conference call interface 400 while the host video window 402 may be sized to encompass a minority of the shared conference call interface 400.

The leave button 407 may provide for interaction over the communication network 106 by the host on the first user device 102A or the guest on the second user device 102B with the communication server 102 signaling their respective termination of the timed one-on-one video conference call.

As described above, the video and audio source buttons 408 provide for selecting a video source and an audio source on each of the first user device 102A and the second user device 102B.

Figure 5:
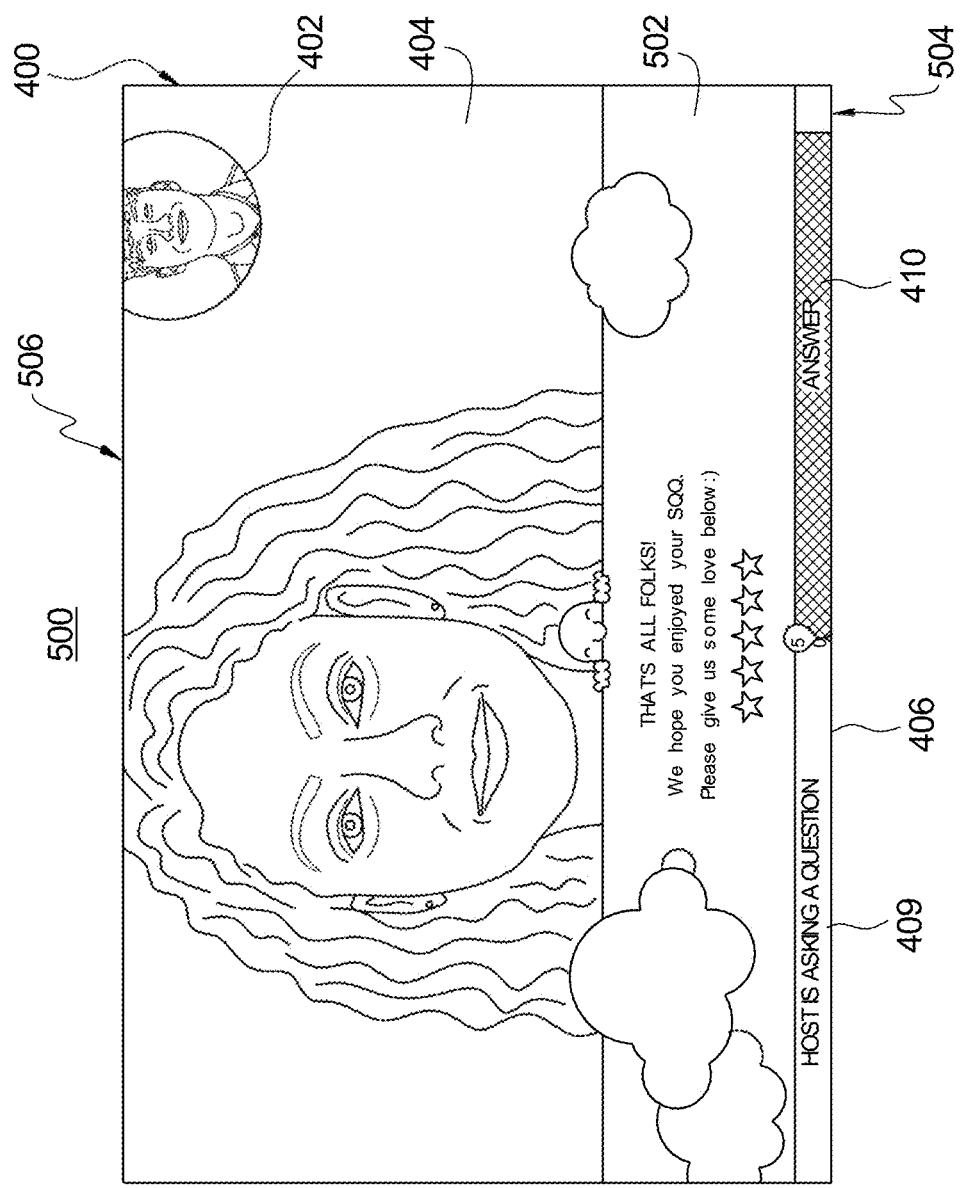
FIG. 5 illustrates an exemplary digital curtain within a shared conference call interface for a timed one-on-one video conference call according to an implementation disclosed herein.

FIG. 5 presents an exemplary digital curtain 502 within a shared conference call interface 400 for a timed one-on-one video conference call according to an implementation disclosed herein. The digital curtain 502 begins a transition from a bottom portion 504 of the shared conference call interface 400 to a top portion 506 of the shared conference call interface 400. The transition begins at the end of the answer portion 410 of the timer ribbon 406.

Figure 6:
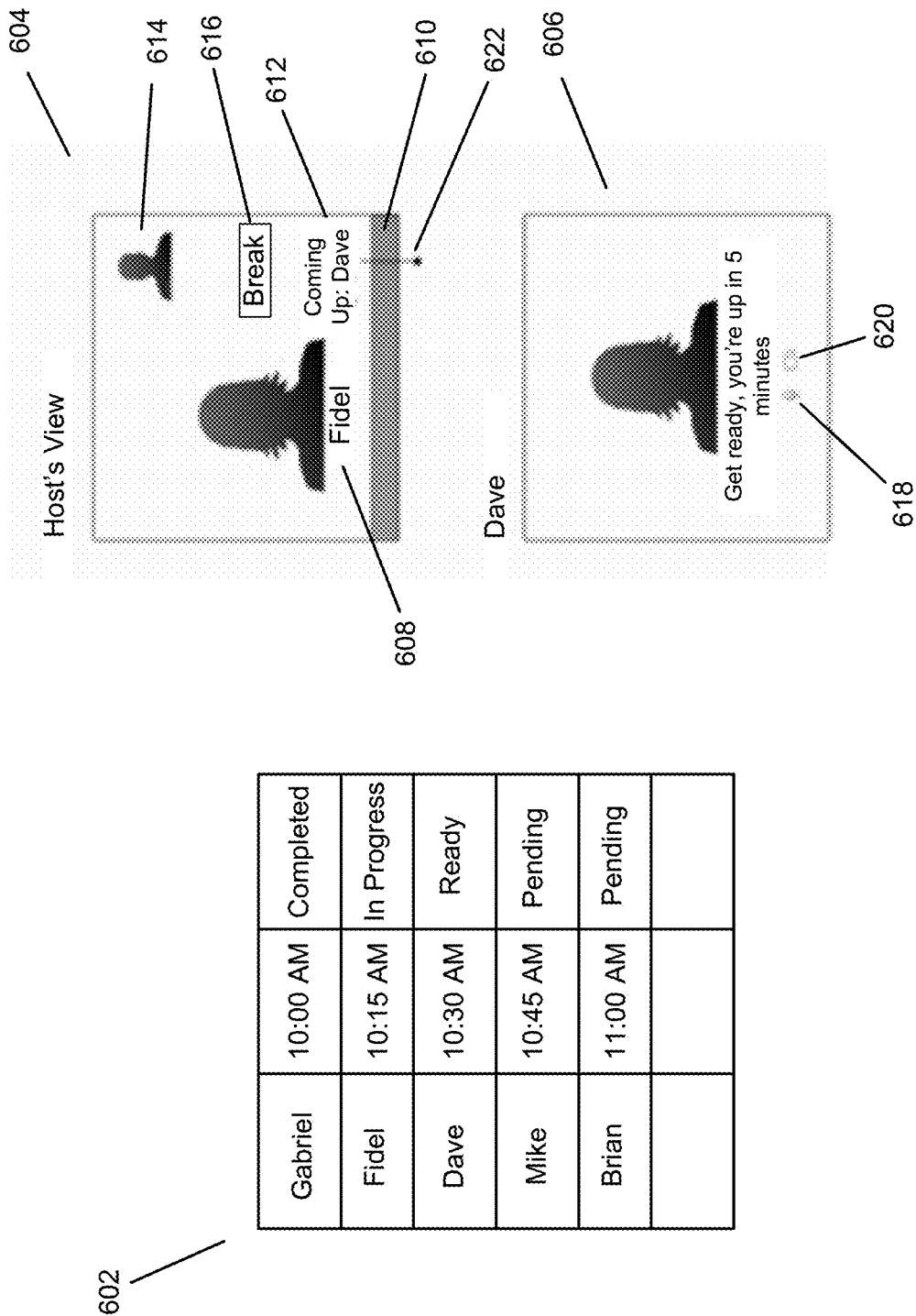
FIG. 6 illustrates an exemplary queue for a timed one-on-one video conference call according to an embodiment of the present invention.

FIG. 6 presents an exemplary queue for a timed one-on-one video conference call according to an embodiment of the present invention. Guests may be placed into a scheduled queue 602 for a timed one-on-one video conference call including a plurality of guests. In one embodiment, the guest may select their time preference and are added to the queue based on their selection. In another embodiment, the guest may be added to the queue 602 in a next available time slot or sequence after a previous guest that was added to the queue 602.

Host's view 604 includes video streams originating from a host 614 and from a current guest 608 corresponding to a current queue block that is in progress. The host's view 604 further includes a timer 610 indicating a total time and time elapsed/remaining 622 in the current queue block and indication 612 of a next guest that is ready in a next queue block. Break 616 may allow the host to initiate a break session.

During the current queue block, the next guest may be presented with a next guest's view 606 indicating that they are coming up next in a given time. The next guest may also select an audio source 618 and a camera source 620 on their user device that will provide for a video stream and an audio stream to be used within the timed one-on-one video conference call.

The presently disclosed timed one-on-one video conference call may be used for achieving various tasks or functionalities for a company. According to one embodiment, timed one-on-one video conference calls may be used as an internal workplace communication tool to eliminate unnecessary meetings and help save companies time and money. Timed one-on-one video conference calls may be integrated with business communication platforms, such as Slack and Microsoft Teams.

Figure 7:
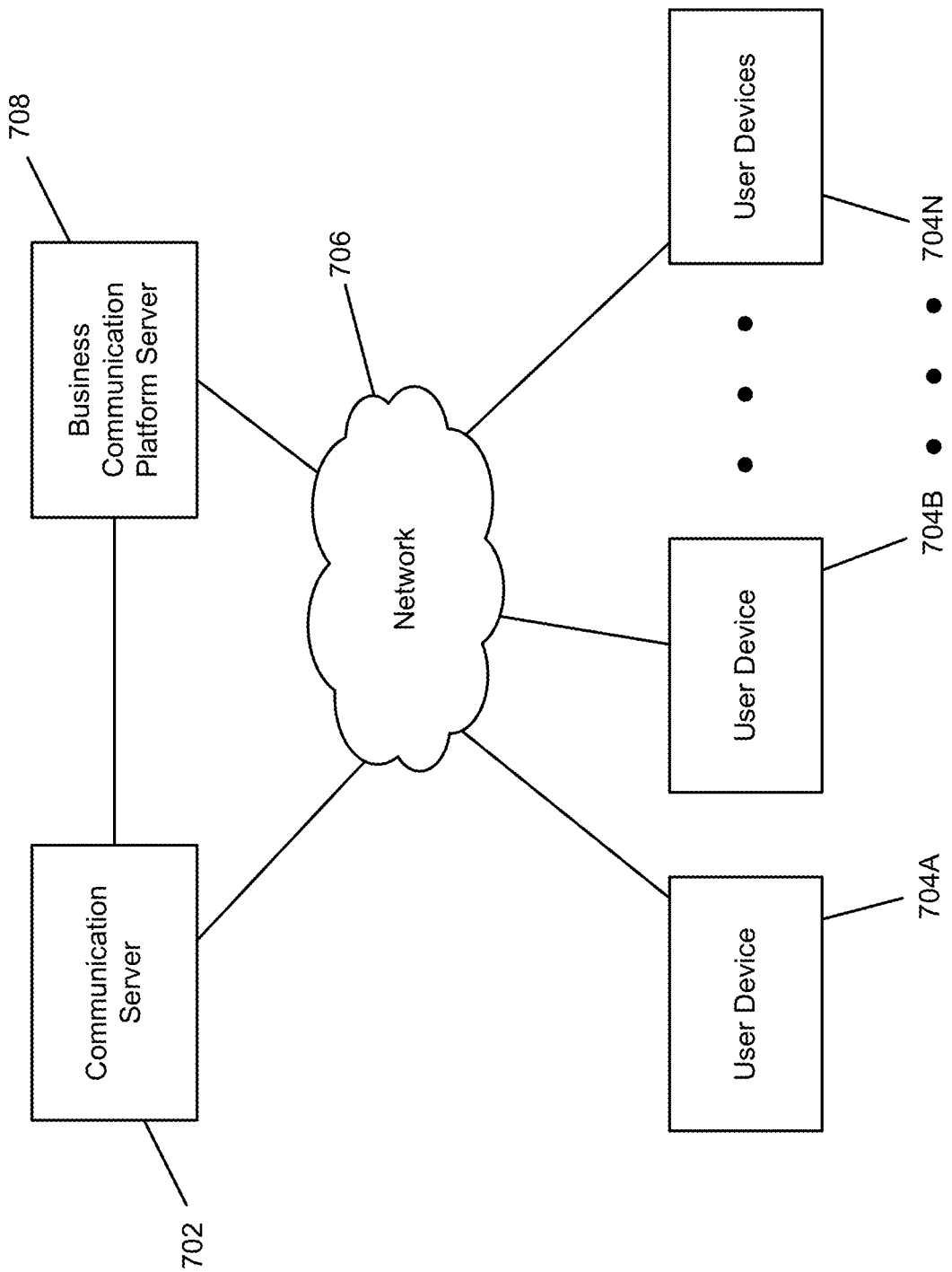
FIG. 7 illustrates an exemplary computing system for providing a timed one-on-one video conference call according to an embodiment of the present invention.

FIG. 7 presents an exemplary computing system for providing a timed one-on-one video conference call according to an embodiment of the present invention. User devices 704A-N may include a smartphone, tablet, laptop, desktop, television, personal digital assistants (PDA), e-book readers, smart watches and smart wearable devices, or any computing device having a central processing unit and memory unit capable of connecting to a network and configured to execute the functionality described herein. The user devices 704A-N may access communication and/or productivity tools (e.g., email, chat, calendar, contacts, etc.) provided by business communication platform server 708 via a communication network 706. The communication tools may comprise cloud computing software-as-a-service ("SAAS") accessible by user devices 704A-N through client applications or web browser clients.

The communication tools may be integrated with a feature for creating and joining timed one-on-one video conference calls. The integration may comprise an API connection between communication server 702 and business communication platform server 708. Each of the user devices 704A-N is capable of initiating and requesting a timed one-on-one video conference call with another one of the user devices 704A-N by sending links through the communication tools. The links may comprise software code or instructions for directing a host on a first user device 704A and one or more guests on second ones of user devices 704B-N to a communication connection with communication server 702.

The links may further instruct the communication server 702 to receive and transmit electronic data from various sources, including but not limited to the user devices 704A-N. For example, the communication server 702 may be operable to receive and post or transmit video and audio streams originating from the user devices 704A-N. The communication server 702 may create a timed one-on-one video conference call session between the first user device 704A and second ones of user devices 704B-N and populate a video call interface that is rendered on the first user device 704A and the second ones of user devices 704B-N with the received video and audio streams. The video call interface may comprise an application, web application, or other software executing on the user devices 704A-N. The communication server 702 may further retrieve user information (e.g., name, company, affiliation, etc.) associated with the user devices 704A-N from business communication platform server 708 and populate the video call interface with the retrieved user information.

The communication server 702 may maintain a conference call timer that limits the timed one-on-one video conference call to a predetermined amount of time, e.g., 60 seconds. The conference call timer may include different portions of a conference call and the determination of a total length of a conference call. The video call interface may further display the conference call timer based on the status of the conference call timer. According to one embodiment, the video call interface may also include a queue and display an indication of one or more other ones of user devices 704N corresponding to one or more time blocks of the queue.

Network 706 may be any suitable type of network allowing transport of data communications across thereof. The network 706 may couple devices so that communications may be exchanged, such as between servers and user devices or other types of devices, including between wireless devices coupled via a wireless network, for example. Network 706 may also include mass storage, such as network attached storage (NAS), a storage area network (SAN), cloud computing and storage, or other forms of computer or machine readable media, for example. In one embodiment, the network 706 may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from user devices may be encrypted using, for example, the Advanced Encryption Standard (AES) with a 128, 192, or 256-bit key size, or any other encryption standard known in the art.

In certain embodiments, a timed one-on-one video conference call may be generated with a type or purpose field which may be provided in a request to initiate the timed one-on-one video conference call. The type or purpose field may be used to show the host and guest on a call interface the nature of the call as well as configure certain settings of the timed one-on-one video conference call, such as length, privacy settings etc. In one embodiment, a timed one-on-one video conference call may be used for sales, such as delivering an "elevator pitch." In another embodiment, a timed one-on-one video conference call may be used by human resources and management for checking in with staff to facilitate regular contact with an entire department without over-scheduling to the point of being counter-productive. In yet another embodiment, a timed one-on-one video conference call may be used for project management to provide brief reports on project statuses so that a team and management may maintain constant visibility on a project without having to be involved on a granular level. Additionally, a timed one-on-one video conference call may be used for design and marketing to allow stakeholders to critique a project to make sure it's heading in the right creative or editorial direction. Timed one-on-one video conference calls may also be used by the medical community, such as for doctor-to-doctor consultations. In certain embodiments, timed one-on-one video conference calls including a plurality of participants may also be split into separate sessions comprising breakout rooms. That is, a current timed one-on-one video conference call may fork into a plurality of new sessions. The communication server 702 may dynamically generate the new sessions based on one or more parameters of the current timed one timed one-on-one video conference call and assign participants (e.g., host and guests) from the timed one-on-one video conference call to each of the new sessions. Participants for each of the breakout rooms may be chosen randomly or by a host.

As disclosed herewith, timed one-on-one video conference calls may provide productivity and collaborative benefits. According to one embodiment, as a way to incentivize use and adoption, users may be awarded points or gift cards for each successfully completed timed one-on-one video conference call to drive more company level adoption of timed one-on-one video conference calls. In order to collect and redeem points, users may be required to create an account with a server associated with hosting the timed one-on-one video conference calls. Activities and earned points (at a company, partner, and individual level) may be aggregated to a unique ID. Examples of actions that may reward users include replacing five meetings with timed one-on-one video conference calls, having a timed one-on-one video conference call with newest team members (new hires feel welcome), entering a competition to see who can use timed one-on-one video conference calls the most (e.g., save most time in a week by replacing meetings and emails with timed one-on-one video conference calls), having timed one-on-one video conference calls with a certain number of difference co-workers by staying connected when remote working (e.g., choosing colleagues that the user hasn't spoken to in a while).

The disclosed timed one-on-one video conference calls may also be integrated within third-party platforms and websites. Examples include sports betting websites, dating websites, financial services platforms, educational technology platform, and retail brand websites.

Traditional dating websites offer users chat features in which they can engage in text conversations via the web or mobile app. By integrating timed one-on-one video conference call technology to these dating websites, users can engage in a brief video conversation with no commitment or exchange of private information. For example, a timed one-on-one video conference call may be initiated with the topic of "Dave, in 15 seconds make your best first impression" followed by "Now Scarlet, your turn. You have 15 seconds to shine." The timed one-on-one video conference calls may be used to bridge the gap between texting and an in-person date.

Sports betting websites may be integrated with a widget through which fantasy sports and betting experts may offer timed one-on-one video conference calls to premium subscribers. For example, users can ask an expert who they should start at running back or what he thinks the line of the Monday night game will be if a certain player remains sidelined due to injury.

Timed one-on-one video conference calls may also be used to provide financial advice to newsletter subscribers or users of investment tools. Auctions and transactions may also be conducted through timed one-on-one video conference calls for buying/selling non-fungible tokens, traditional sports cards, fine wine, art, etc.

Makeup and beauty companies may also use timed one-on-one video conference calls to offer free services, such as matching users of with their proper color palette. For example, brand customers can call a beauty expert with two different shades of eye shadow and ask which one is more complimentary or appropriate for the occasion. Similarly, dieticians and fitness experts may provide health-related advice and tips, such as correct eating and exercise, through timed one-on-one video conference calls.

Timed one-on-one video conference calls can also be used in an academic setting, such as for lectures or office hours, and in town hall meetings. Users may be provided with a public link where they can reserve a timed one-on-one video conference call. For example, a professor wants to dedicate an hour of his calendar to answer questions about topic X. The professor may reserve and publish a timed one-on-one video conference call link. The professor can define how much time he/she is going to be talking about topic X, and the rest of the time may be allocated for questions from students (e.g., a minute each question). Students can register for the timed one-on-one video conference call without having to actively participate and merely watch. When it is time to ask questions during the timed one-on-one video conference call, student may request to speak, and the professor can give them the ability to ask a question (e.g., enable microphone for the student). Similarly, politicians can invite their constituents to hear an address and then can offer a number of timed one-on-one video conference calls to those with questions.

Figure 8:
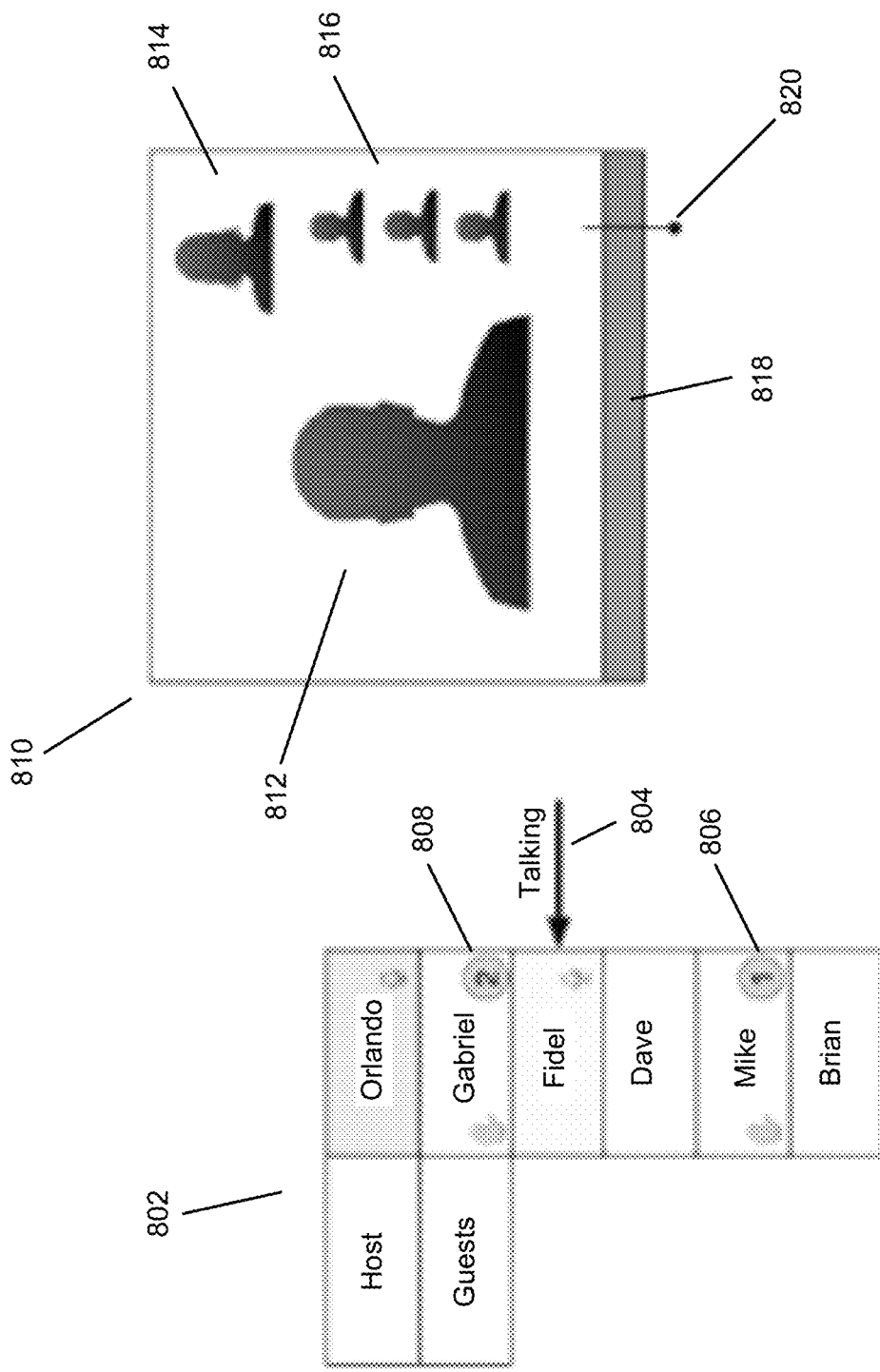
FIG. 8 illustrates an exemplary open forum feature for a timed one-on-one video conference call according to an embodiment of the present invention.
Figure 9:
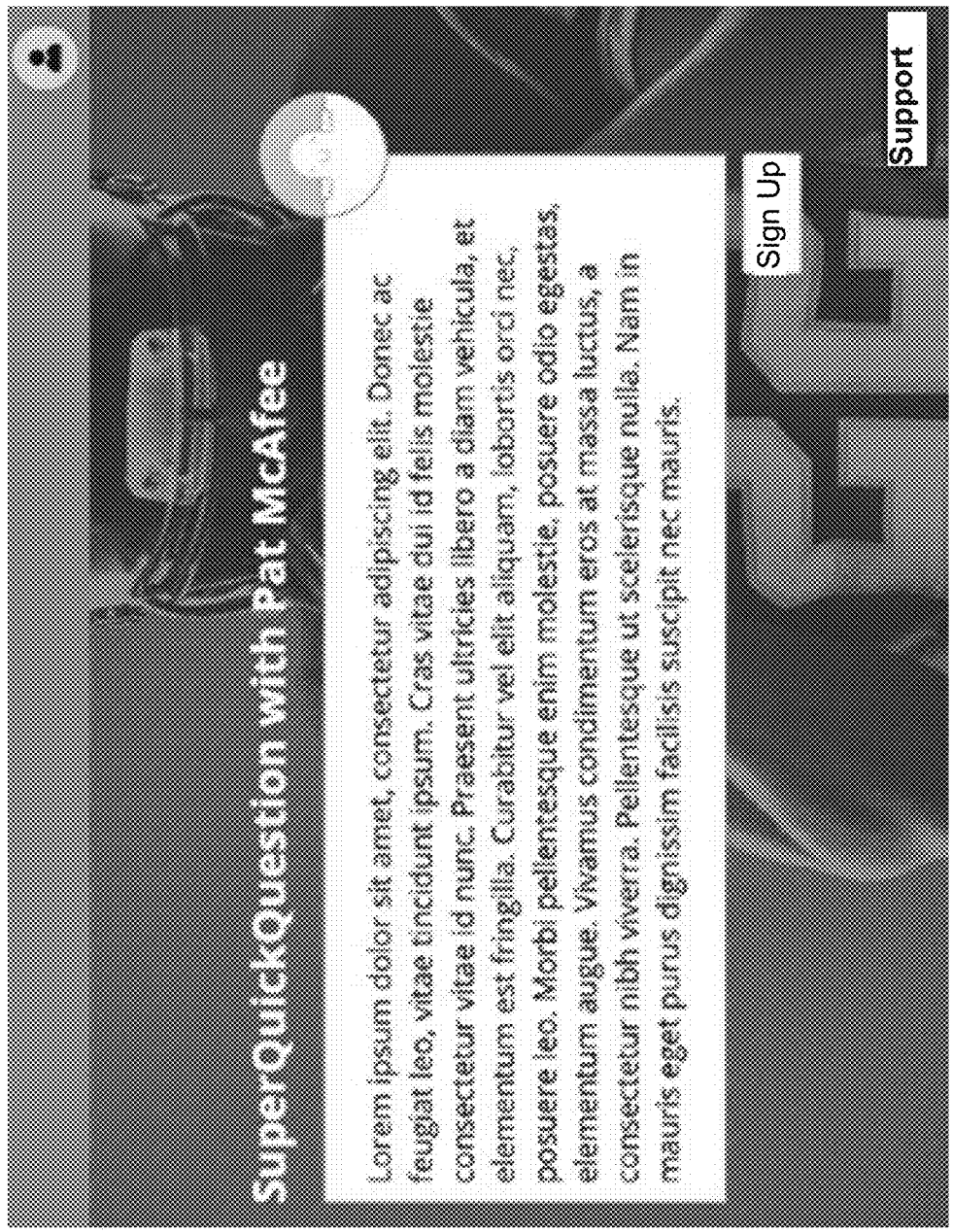
FIGS. 9 through 15 illustrate an exemplary website integrated with timed one-on-one video conference calls according to an embodiment of the present invention.

FIG. 8 presents an exemplary open forum feature for a timed one-on-one video conference call according to an embodiment of the present invention. A host may configure a timed one-on-one video conference call to allow for the host to give a talk and then open up the call to questions from an audience. Guests may be placed into a queue 802 for the timed one-on-one video conference call by entering, e.g., a "raise hand" request. A guest at the top of the queue 802 may be granted the ability to speak (804) in the timed one-on-one video conference call for a given duration, as indicated by timer 818 and time elapsed/remaining 820. The ability to speak may be given from guest to guest. A next speaking guest (806) on the queue 802 may be allowed to speak after the given duration for the current speaking guest has expired. A further speaking guest (808) may be allowed to speak after the speaking guest (806). A host's view 810 includes video streams originating from a host 814 and from a current guest 812 corresponding to a current speaking guest. Pending speaking guests 816 are also presented alongside the current guest 812.

Other examples for implementing timed one-on-one video conference calls may include customer service questions for quick questions and answers. Timed one-on-one video conference calls may also be used for "suggestion boxes" where participants may remain anonymous, or for surveys, e.g., to win a gift card, etc. According to another embodiment, timed one-on-one video conference calls may also be "gamified," e.g., challenges, such as "Can You Do This in 60 Seconds?" betting, such as "Think You Can Do This in a Minute?"

FIGS. 9 through 15 present an exemplary website integrated with timed one-on-one video conference calls according to an embodiment of the present invention. The website presented in FIG. 9 may comprise a sports betting or fantasy sports contest website. The website may host events that may be offered to members for soliciting advice from experts by participating in timed one-on-one video conference calls with the experts. The website includes information about the events and functionality to sign up for the events.

Figure 10:
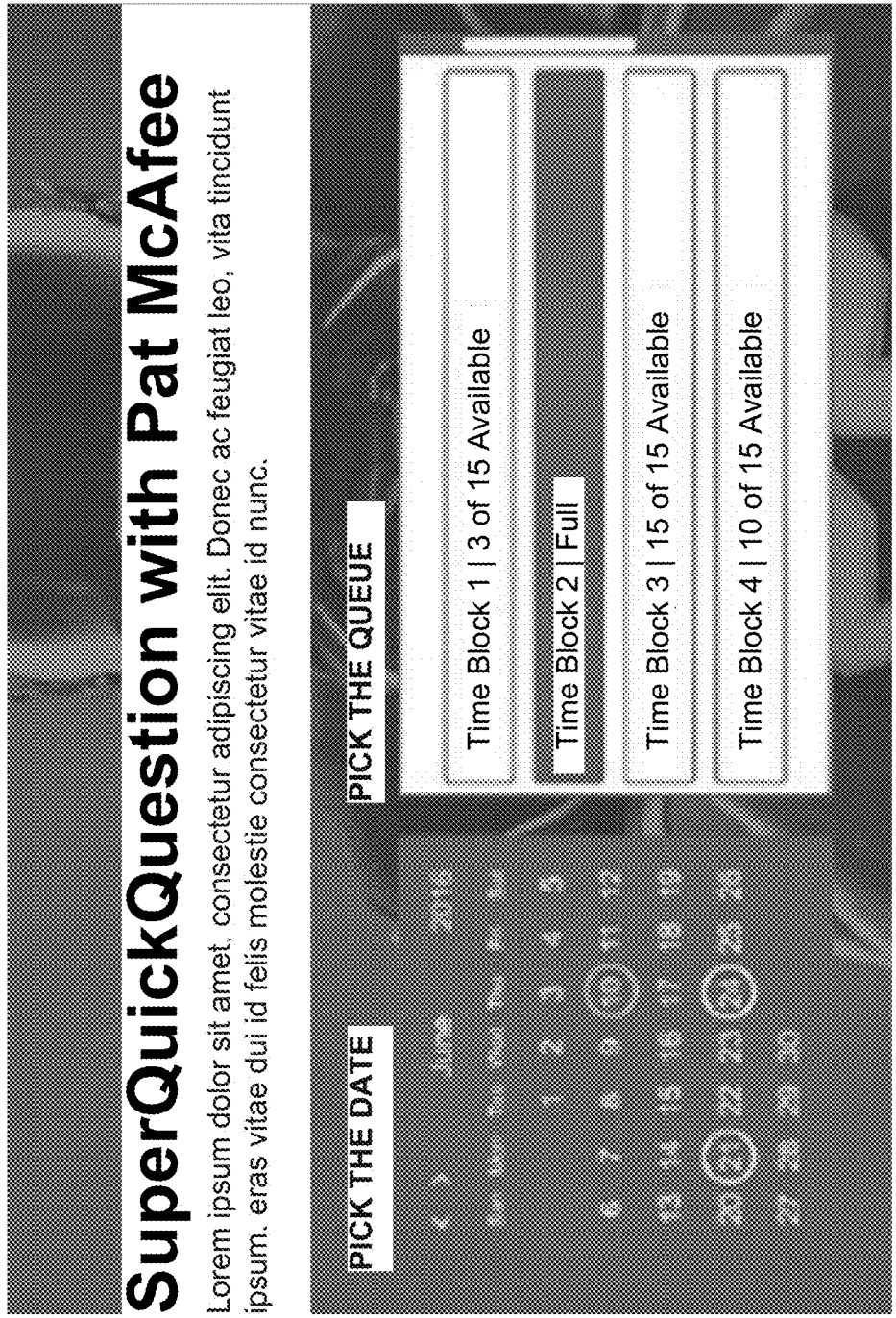
Figure 11:
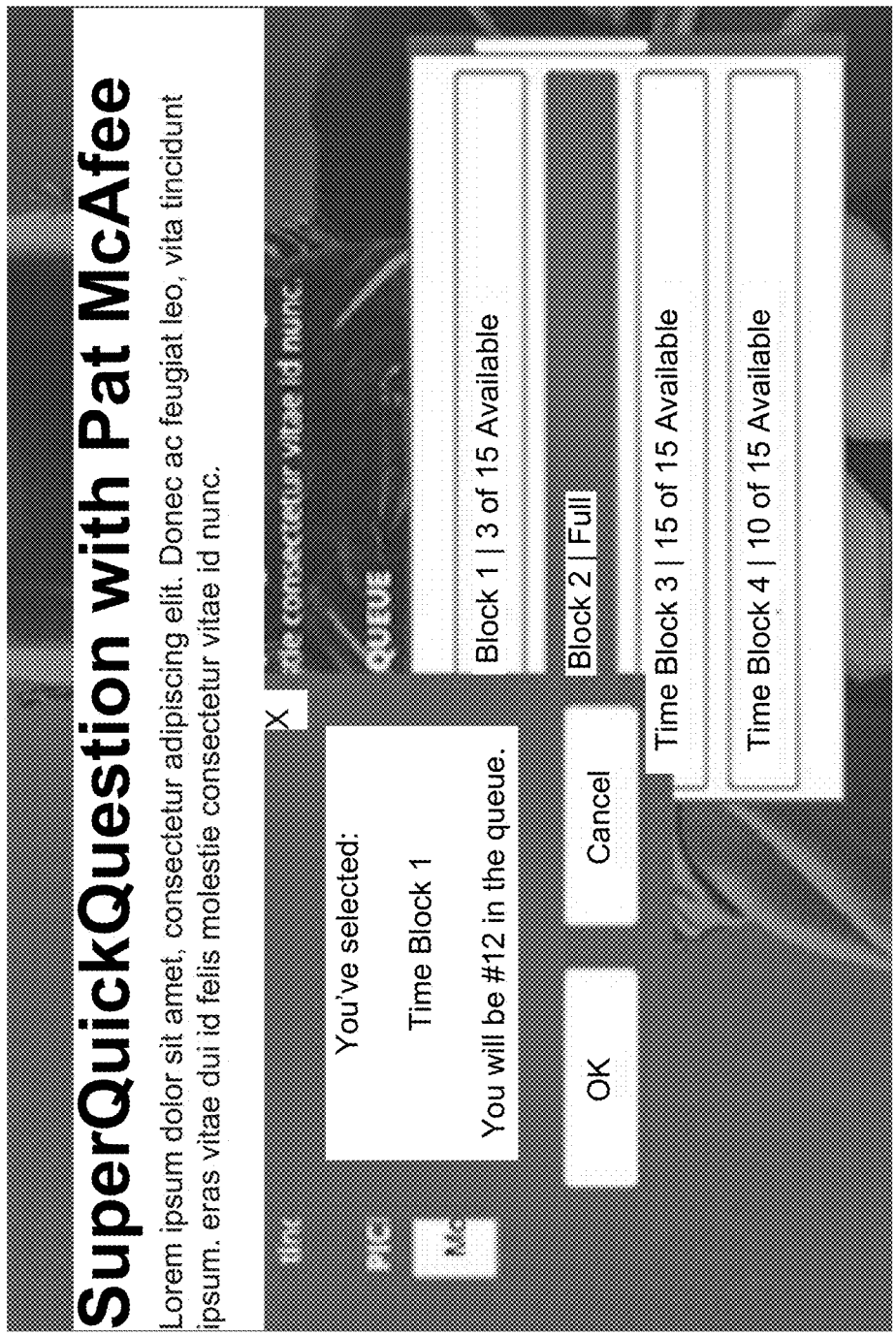

The event may be offered on one or more days, as illustrated in FIG. 10. A member may select a date from a calendar showing dates of when the events are scheduled. Upon selecting a date, the user may also select an available time slot in a queue for that date. Alternatively, a time slot may be automatically assigned to the user and the user need only to select from dates via a drop-down menu. Each of the time slots in the queue may correspond to individual timed one-on-one video conference call sessions during the event. When the user selects a date/queue, a pop-up window may be presented confirming their selection indicating their spot for the event (FIG. 11).

Figure 12:
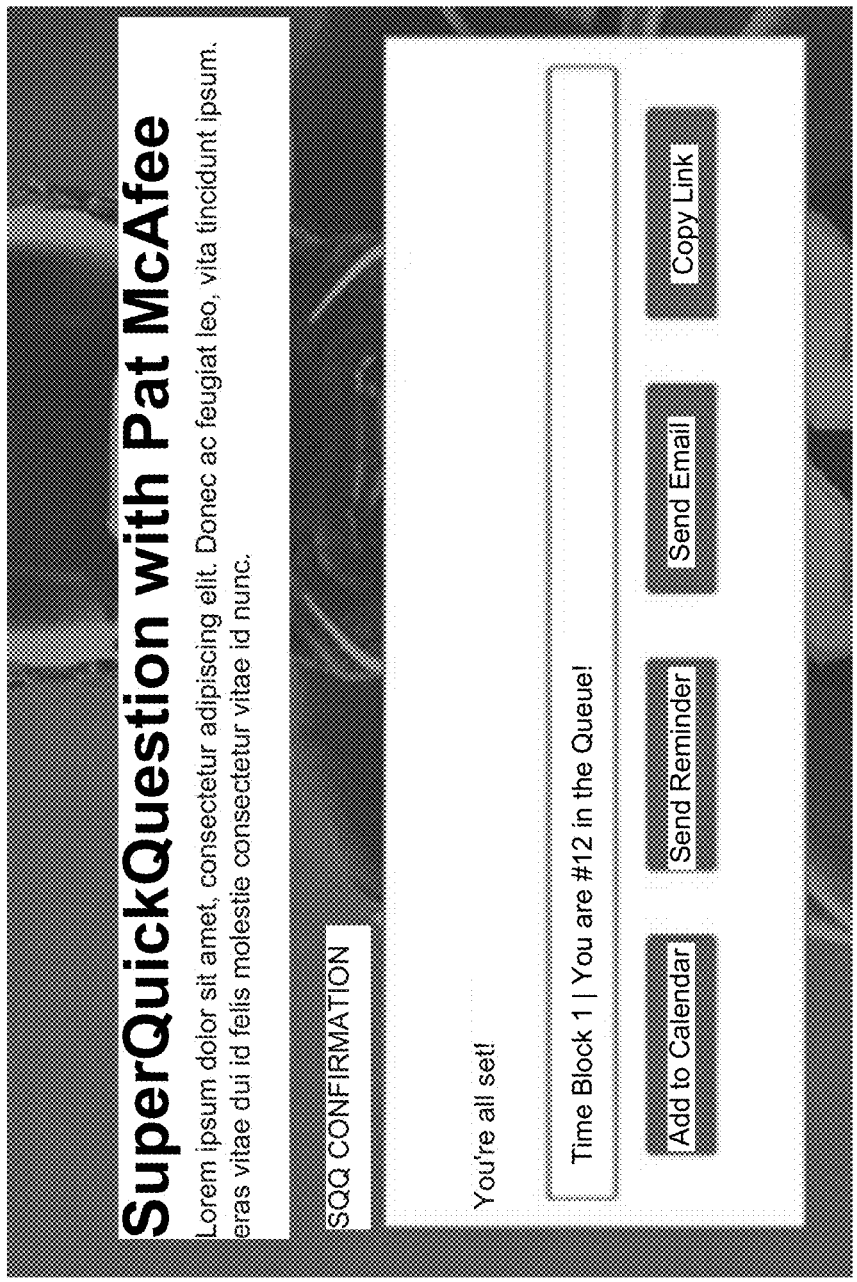

A confirmation page, as illustrated in FIG. 12, may also be presented to the user displaying the information about their selected/scheduled queue with ways for the user to be reminded/notified when it's time to participate in the timed one-on-one video conference call. The user may access a page for the scheduled timed one-on-one video conference call via a link generated on the confirmation page.

Figure 13:
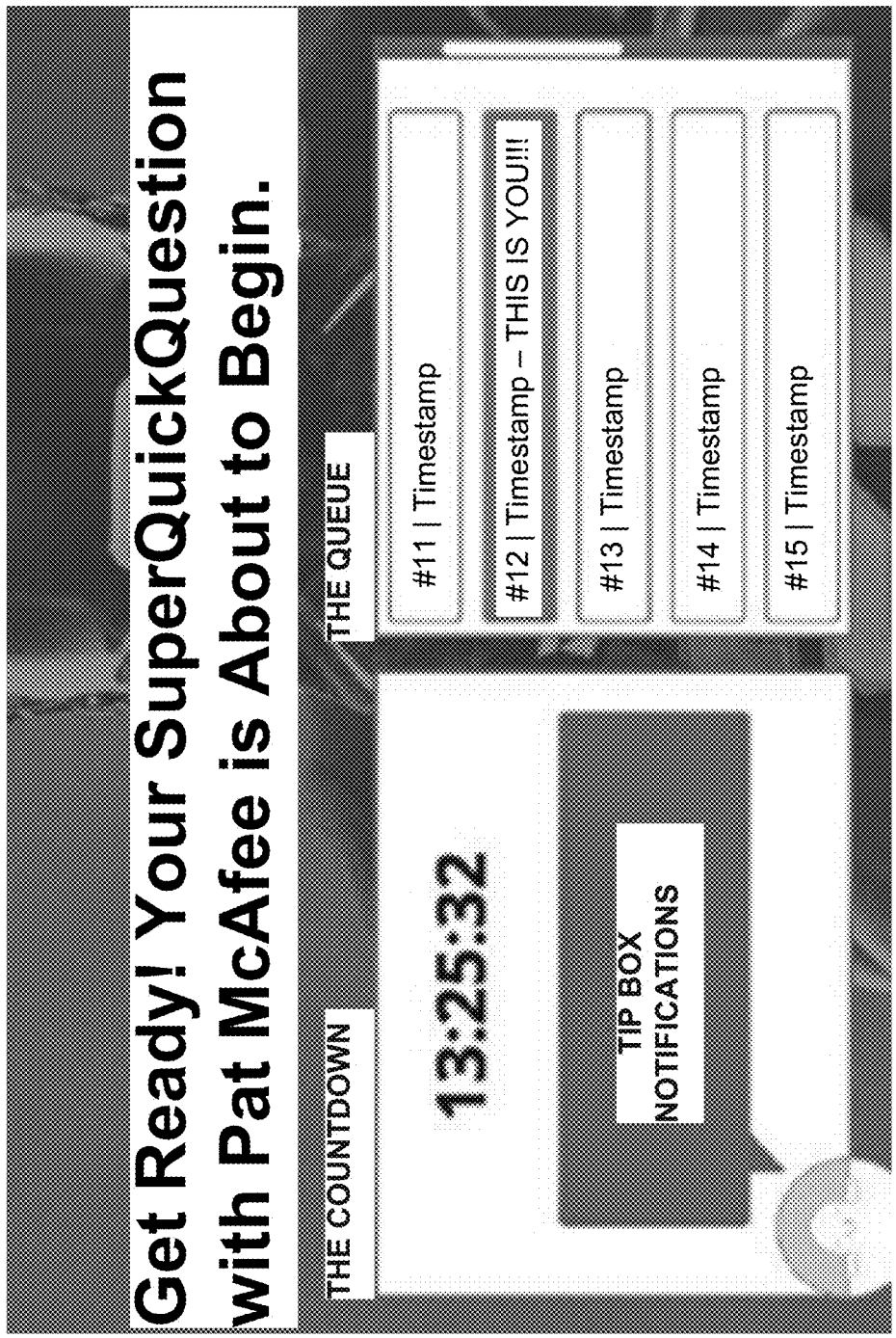

FIG. 13 presents an exemplary preview page of the timed one-on-one video conference call prior to the start of the event. The preview page includes a countdown clock with messages/content for the user to consume while they wait for their turn. An event queue may be displayed with colorful indicators/animations bringing attention to their placement in the queue.

Figure 14:
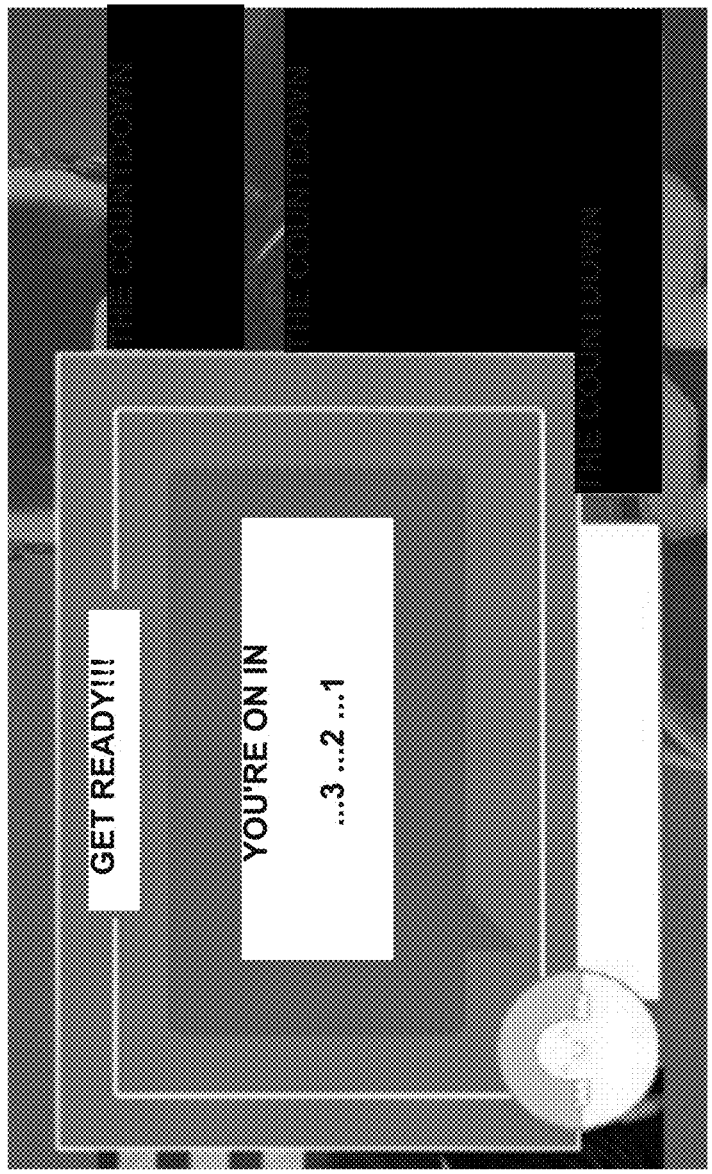
Figure 15:
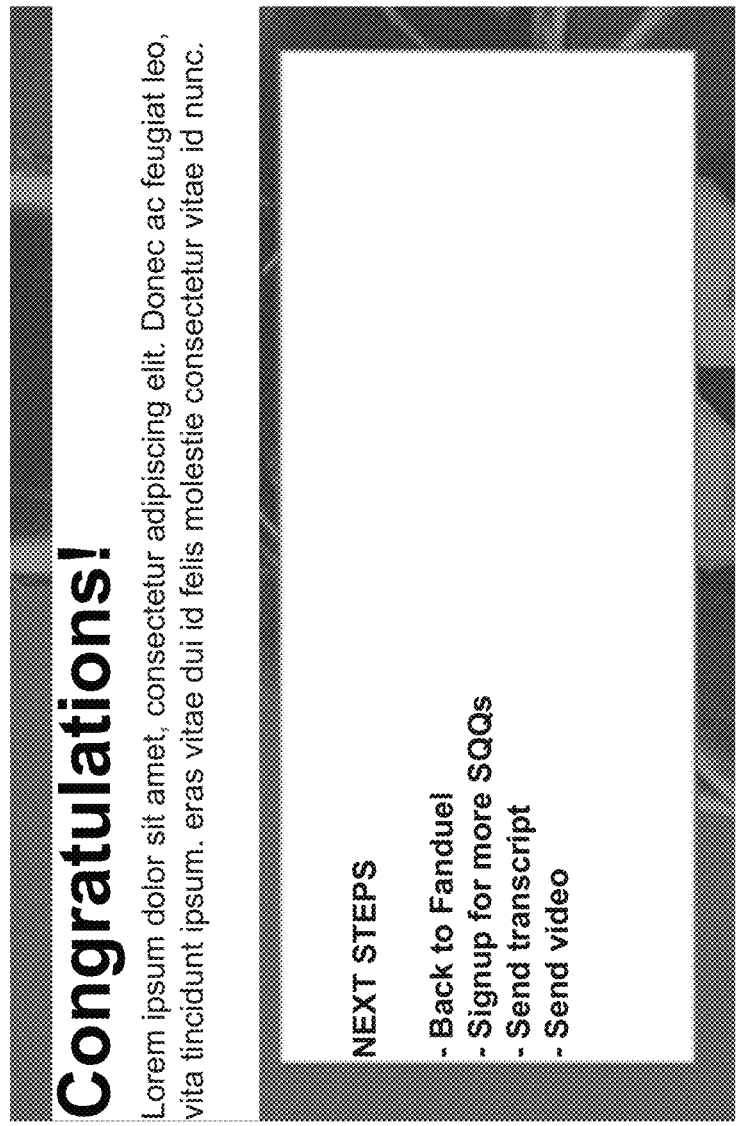
Figure 16:
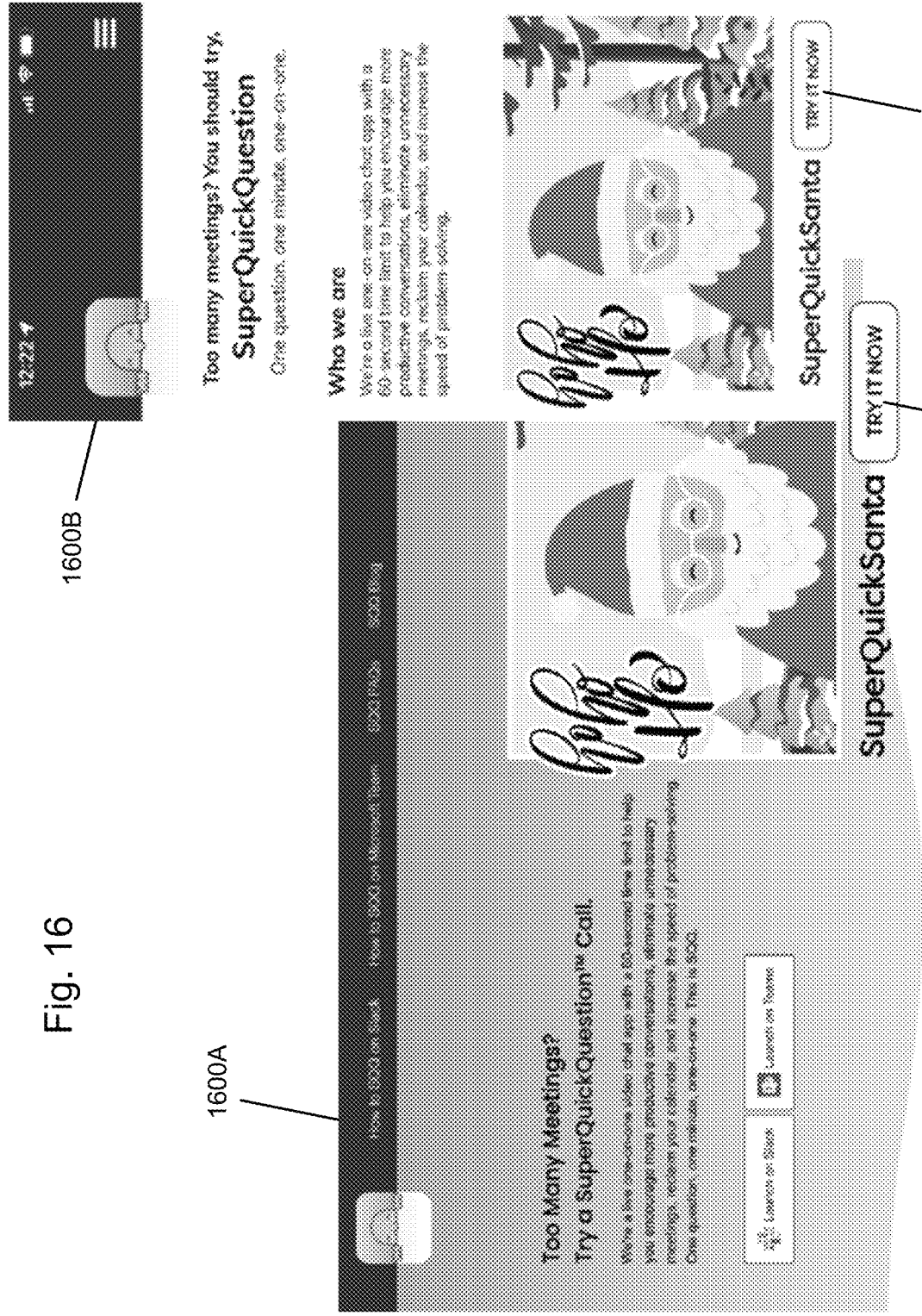
FIGS. 16 through 26 illustrate alternative guest web browser and mobile application interfaces, as shown side-by-side, and host web browser interfaces that may be used to establish timed one-on-one video conference calls according to embodiments of the present invention.

FIG. 14 presents an exemplary countdown popup alert comprising a visual and audio indicator that the user's timed one-on-one video conference call session is about to start. At the end of the countdown, the timed one-on-one video conference call session may commence as disclosed above. When the timed one-on-one video conference call session is over, the user may be directed to a screen, as illustrated in FIG. 15 with next steps that the user may take.

FIGS. 16 through 26 present alternative guest web browser and mobile application interfaces, as shown side-by-side, and host web browser interfaces that may be used to establish timed one-on-one video conference calls according to embodiments of the present invention. Website 1600A and mobile application 1600B may comprise a homepage or a unique page for a promotion that allows guests to participate in a timed one-on-one video conference call with "Santa." Website 1600A and mobile application 1600B include button 1602A and 1602B, respectively, which may be configured to launch a registration page to join a queue on the timed one-on-one video conference call.

Figure 17:
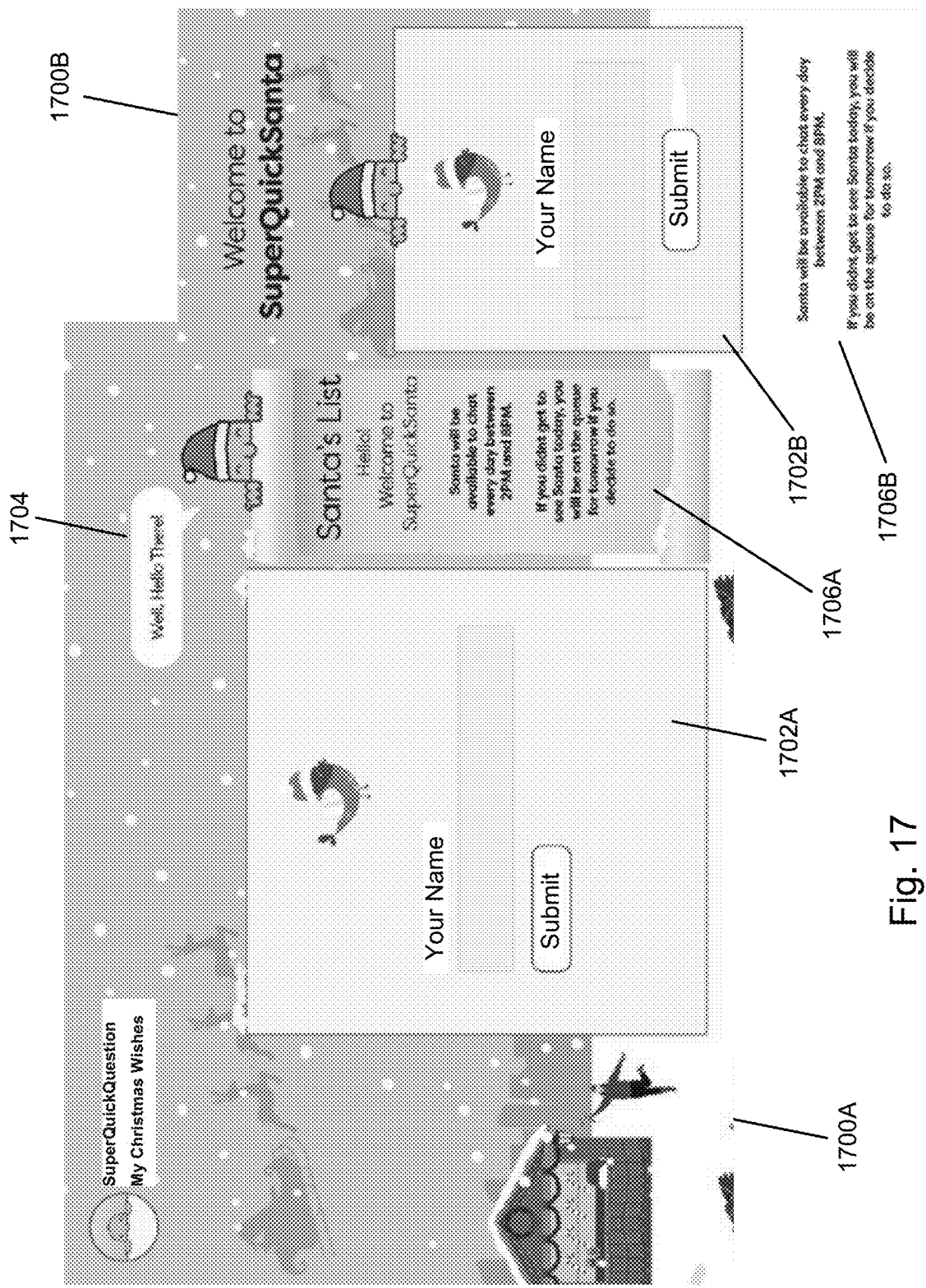

FIG. 17 presents exemplary interfaces to register for entering a queue of a timed one-on-one video conference call according to an embodiment of the present invention. Before joining a timed one-on-one video conference call, a guest may register to join the host's queue (e.g., "Santa"). A guest may be asked to enter their name or email address in dialog windows 1702A and 1702B of webpage 1700A and mobile application screen 1700B, respectively. Information entered in dialog windows 1702A and 1702B may be passed over to a host of the timed one-on-one video conference call to be added to the host's queue.

Webpage 1700A further includes a message balloon 1704 comprising text that may be used to greet, entertain, and/or guide a guest in the process of registering for the timed one-on-one video conference call. Additionally, certain graphical elements, such as themes, icons, images, and background of webpage 1700A and mobile application screen 1700B may be customized. For example, in the illustrated embodiment, graphical elements of webpage 1700A and mobile application screen 1700B comprise a Christmas theme. Message dialog 1706A and 1706B may comprise a text field including messages from the timed one-on-one video conference call server or system. The messages may include information and/or details regarding availability of registering for a timed one-on-one video conference call with the host. Message dialog 1706A and 1706B, may also be configured with customizable themes, images, icons, and text, e.g., "Santa's List."

Figure 18:
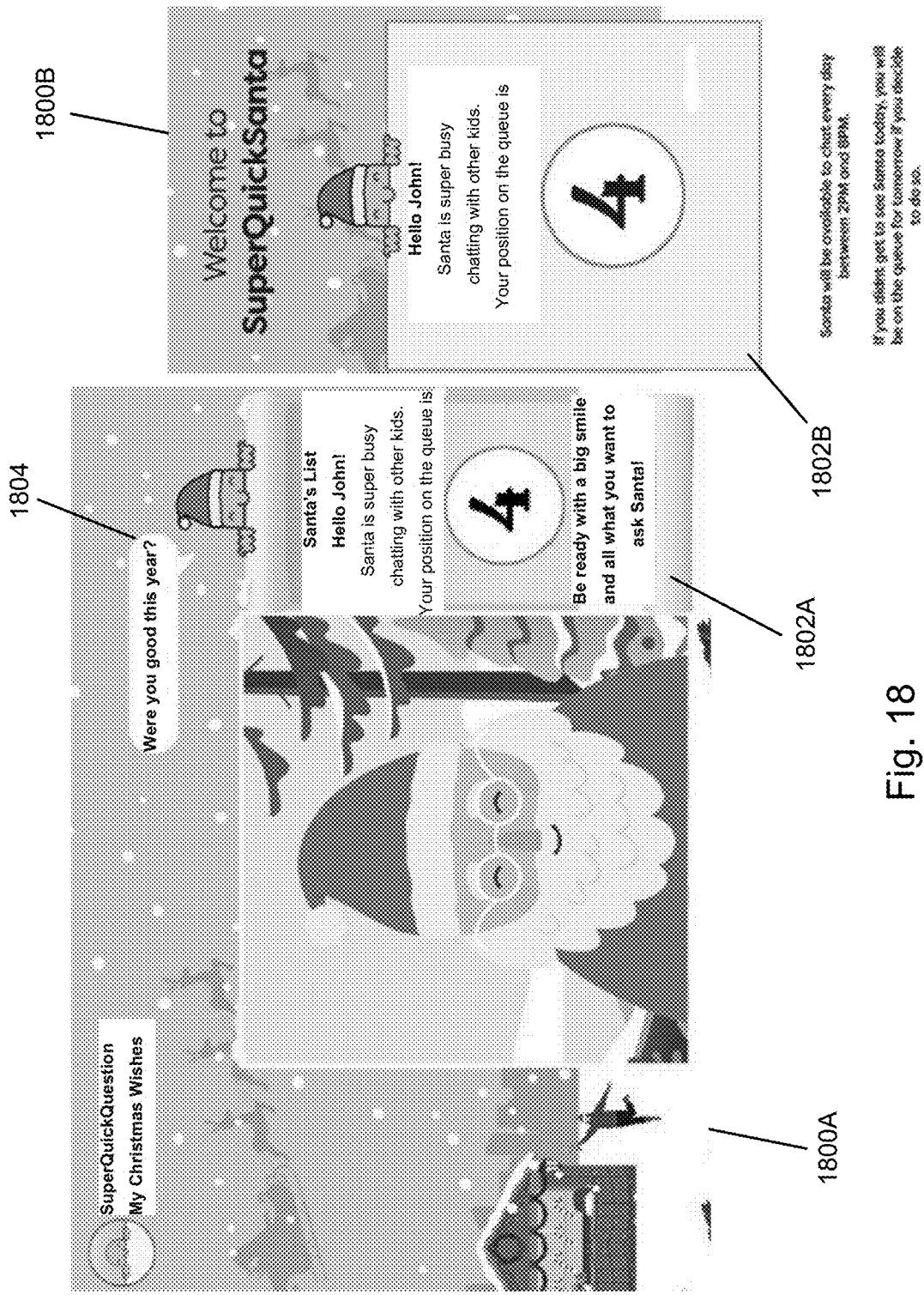

FIG. 18 presents exemplary guest queuing interfaces according to an embodiment of the present invention. Webpage 1800A and mobile application screen 1800B include message dialog 1802A and 1802B, respectively. Message dialog 1802A and 1802B may be populated with an indicator that displays the position of the guest on the host's queue. The indicator may count down allowing the guest to see that their turn to join the host is getting closer. The Webpage 1800A further includes a message balloon 1804 comprising text that may be used to entertain and/or guide the guest while waiting in the queue for the timed one-on-one video conference call.

Figure 19:
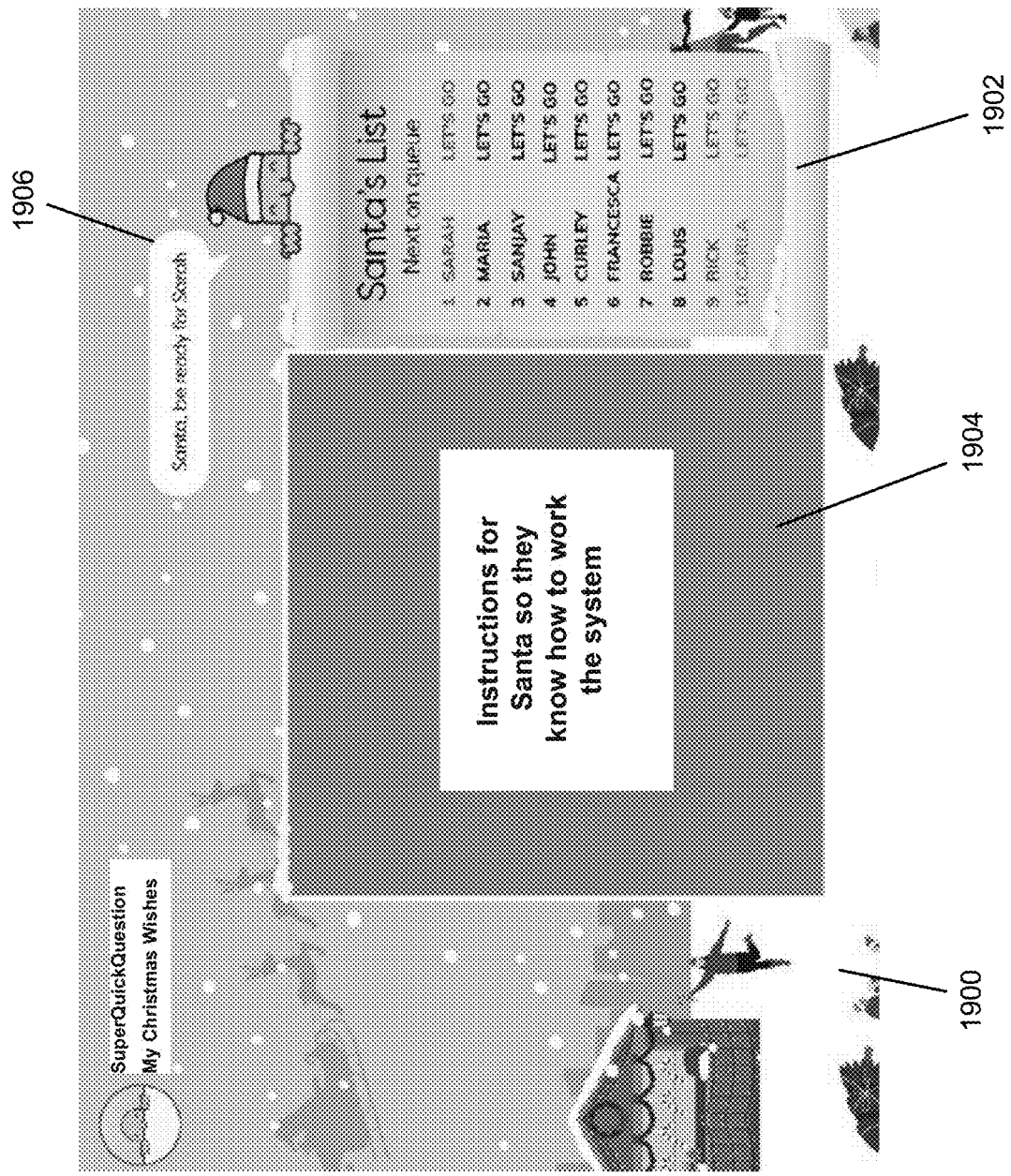

FIG. 19 presents an exemplary host queuing interface according to an embodiment of the present invention. The host may manage a queue for the timed one-on-one video conference call via a webpage 1900. The webpage 1900 may be accessed by a unique link or address associated with an account or login/email address and password combination. Webpage 1900 includes a message dialog 1902 comprising a virtual queue. The virtual queue may allow the host to accommodate one or more guests for a timed one-on-one video conference call session. The virtual queue includes a list of queue requests from guests indicated by the guests' names and functionality to launch timed one-on-one video conference call invitations. The host may be allowed to skip over certain guests on the queue. The host may select a given name on the message dialog 1902 to initiate a timed one-on-one video conference call session and send an invitation to the initiated timed one-on-one video conference call session to the corresponding guest.

Upon sending the invitation, the host may be directed to a lobby to wait for the guest's response to join the timed one-on-one video conference call session. The guest may be given a predetermined amount of time to join the timed one-on-one video conference call session before timing out and removal from the queue. Instructions 1904 may comprise instructions for the host in using the host queuing interface. Webpage 1900 further includes a message balloon 1906 comprising text that may be used to further guide the host on the status of the virtual queue, e.g., the next person the queue.

Figure 20:
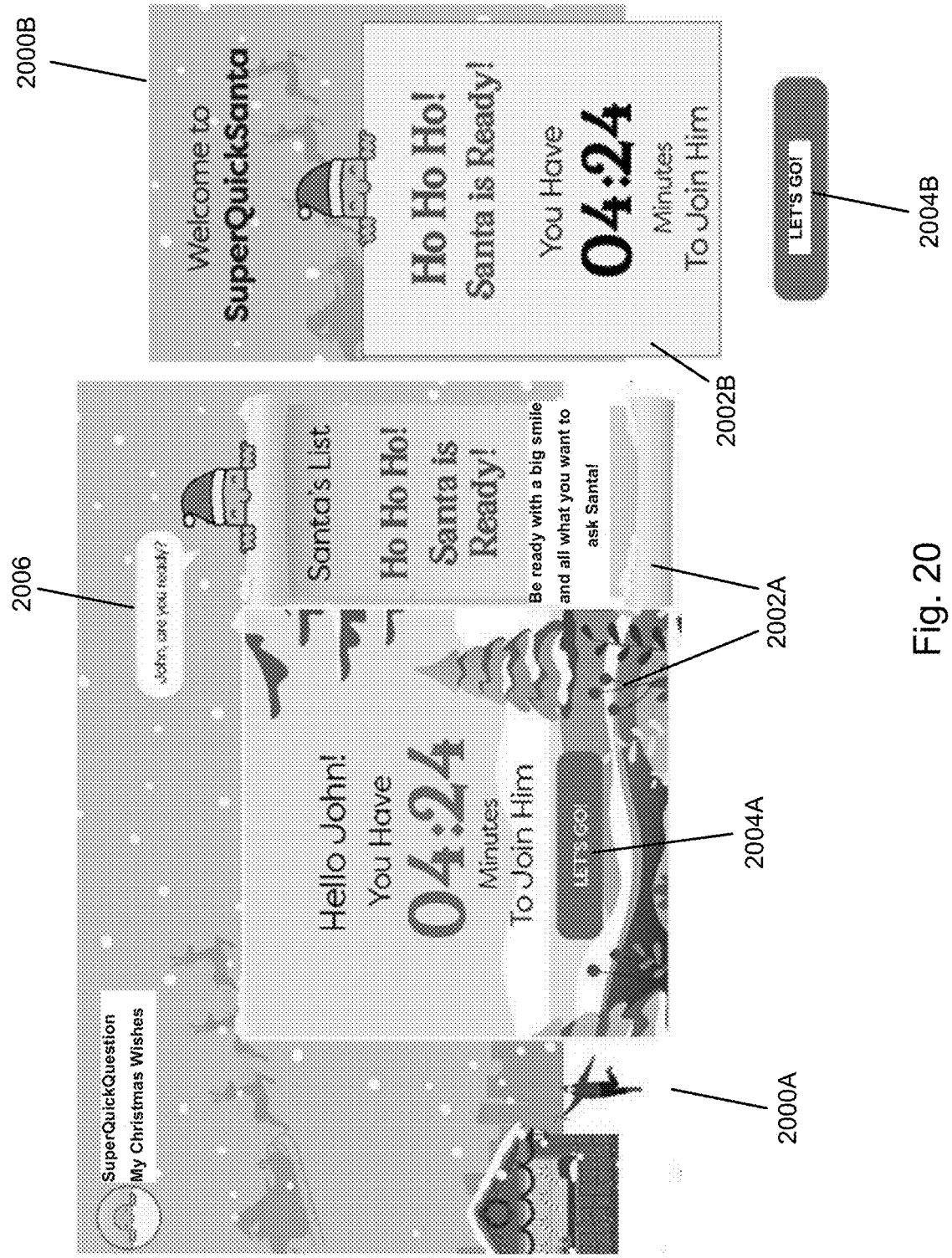

FIG. 20 presents exemplary queue ready interfaces for an invited guest according to an embodiment of the present invention. A guest may be presented with a transition from webpage 1800A or mobile application screen 1800B to webpage 2000A or mobile application screen 2000B, respectively, to indicate that their position in the queue is ready and indicate that it's the guest's turn. The webpage 2000A and mobile application screen 2000B may notify the guest that an invitation to the timed one-on-one video conference call session is pending for the guest to join.

Webpage 2000A and mobile application screen 2000B include message dialog 2002A and 2002B for messaging functionality, such as a countdown indicating a time remaining to join the timed one-on-one video conference call session. Webpage 2000A further includes a message balloon 2006 to guide the guest on joining the timed one-on-one video conference call session. The guest may join the timed one-on-one video conference call session via buttons 2004A and 2004B.

Figure 21:
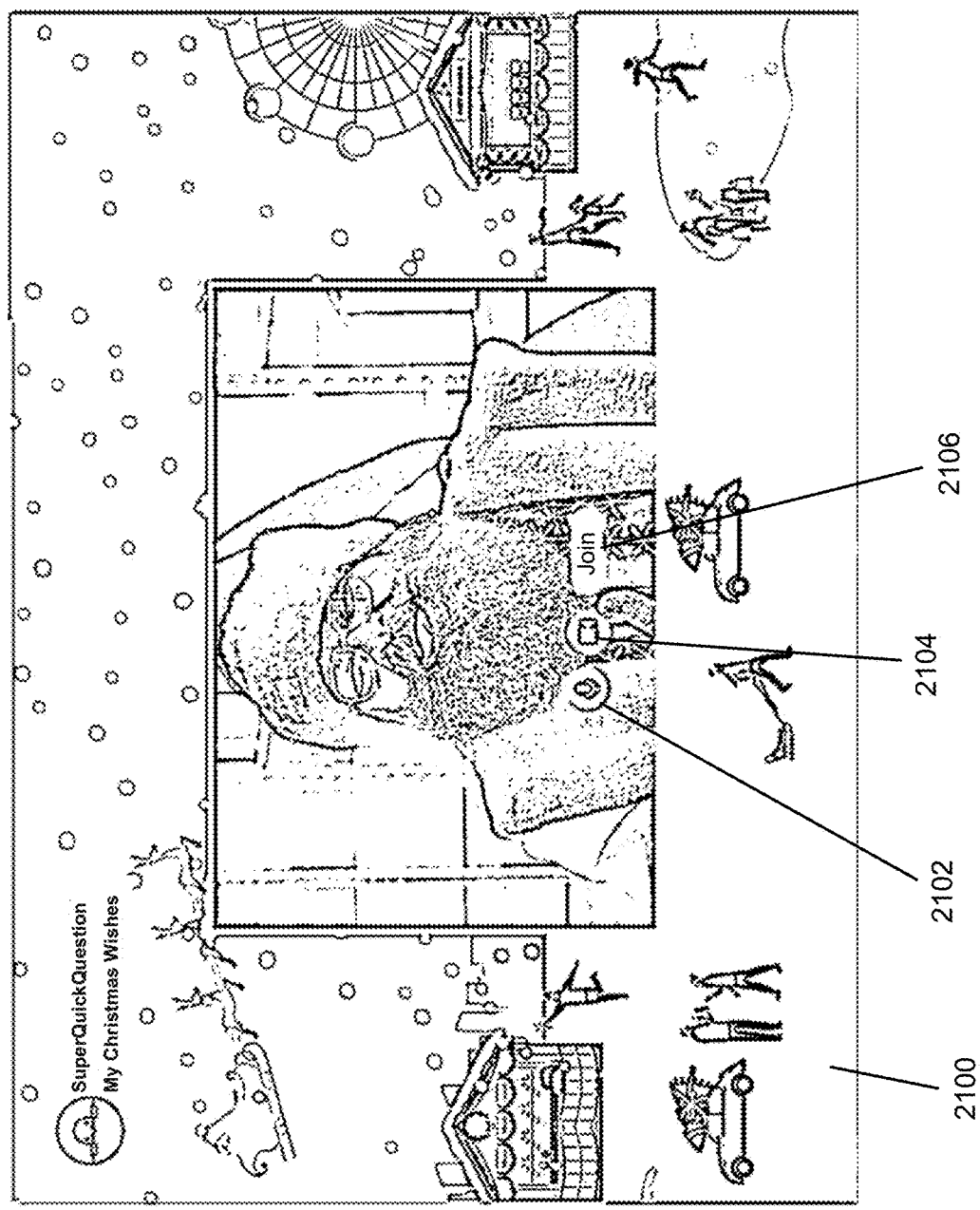

FIG. 21 presents an exemplary host lobby interface according to an embodiment of the present invention. Webpage 2100 includes microphone 2102 and camera 2104 that provide for selection of a video source and an audio source on the host's device. In particular, microphone 2102 allows the host to select an audio source and camera 2104 allows the host to select a camera source. The audio source and the camera source provide for a video stream and an audio stream to be used within the timed one-on-one video conference call. Join button 2106 allows the host into the timed one-on-one video conference call with a guest.

Figure 22:
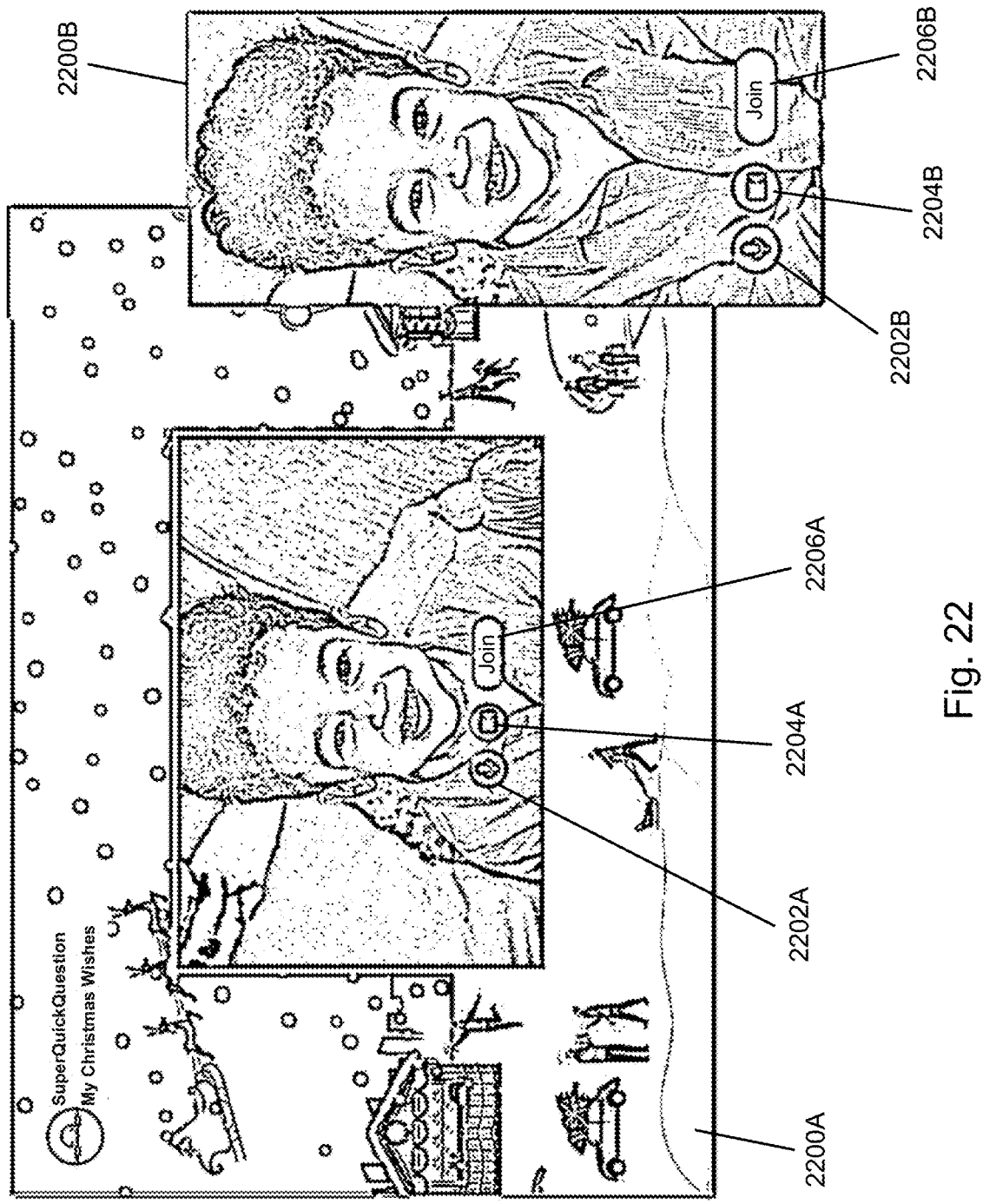

FIG. 22 presents an exemplary guest lobby interface according to an embodiment of the present invention. Webpage 2200A and mobile application screen 2200B includes microphone 2202A and 2202B, respectively, that allows a guest to select an audio source on the guest's device and camera 2204A and 2204B, respectively, that allows the guest to select a video source on the guest's device that will provide for a video stream and an audio stream to be used within the timed one-on-one video conference call. Join buttons 2206A and 2206B allow the guest to participate in the timed one-on-one video conference call with the host. Once join signals are received from both the host and the guest, a shared conference call interface may be rendered on both the host's device and the guest's device to begin the timed one-on-one video conference call.

Figure 23:
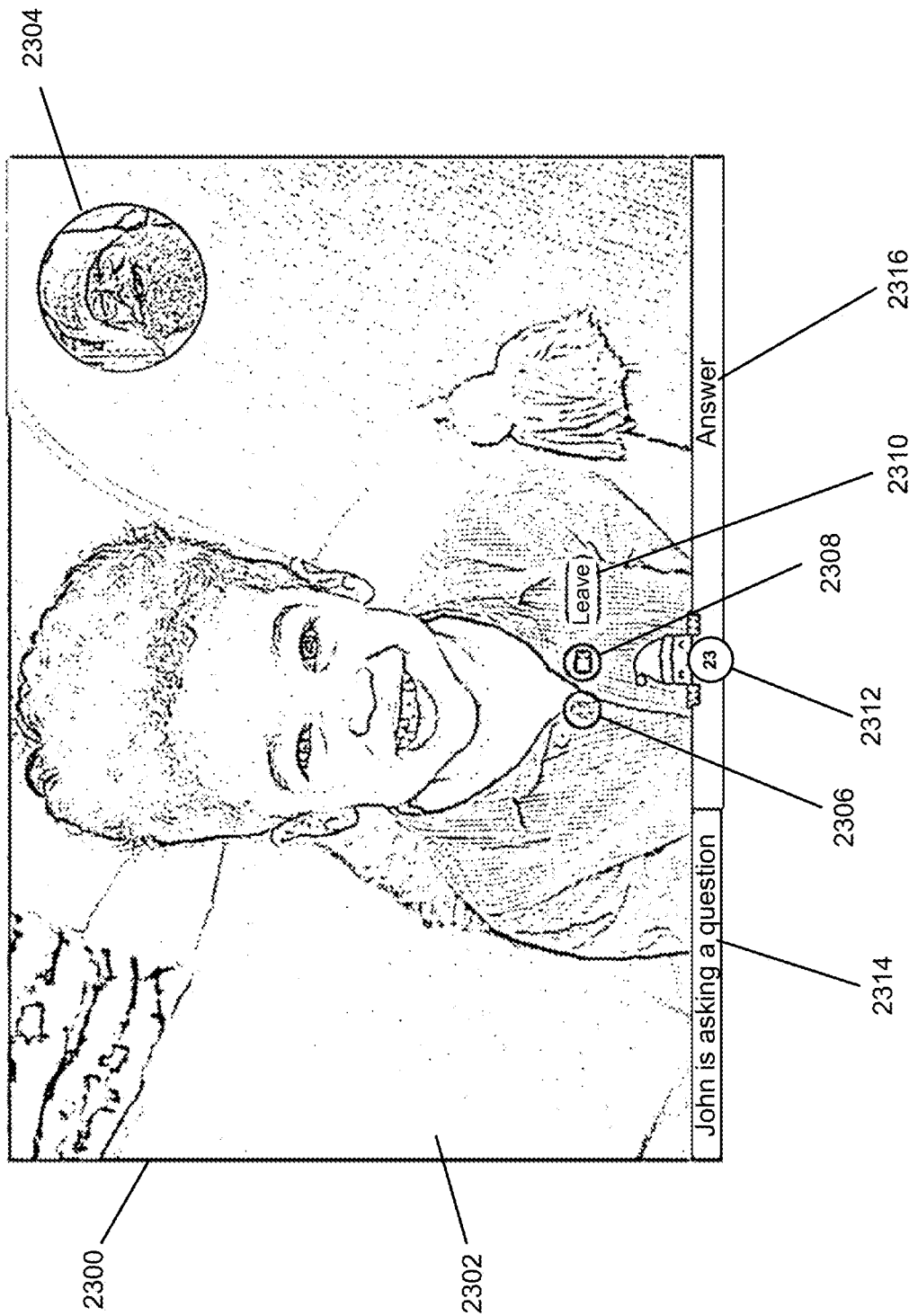

FIG. 23 presents an exemplary host conference call interface according to an embodiment of the present invention. The host conference call interface comprises a webpage 2300 including a guest video window 2302 that displays a video stream along with an audio stream originating from the user device of the guest. Host video window 2304 displays a video stream along with an audio stream originating from the user device of the host. Microphone 2306 may allow the host to enable/disable an audio source (e.g., mute). Camera 2308 may allow the host to enable or disable their video feed. Leave button 2310 may provide for interaction by the host for signaling their respective termination of the timed one-on-one video conference call.

A timer ribbon 2312 provides a visual display of the timer count up to a total length of time. The timer ribbon 2312 may be divided into a question portion 2314 and an answer portion 2316. While the timer ribbon 2312 is in the question portion 2314, the guest video window 2302 may be sized to encompass the majority of the host conference call interface while the host video window 2304 may be sized to encompass a minority of the host conference call interface.

Figure 24:
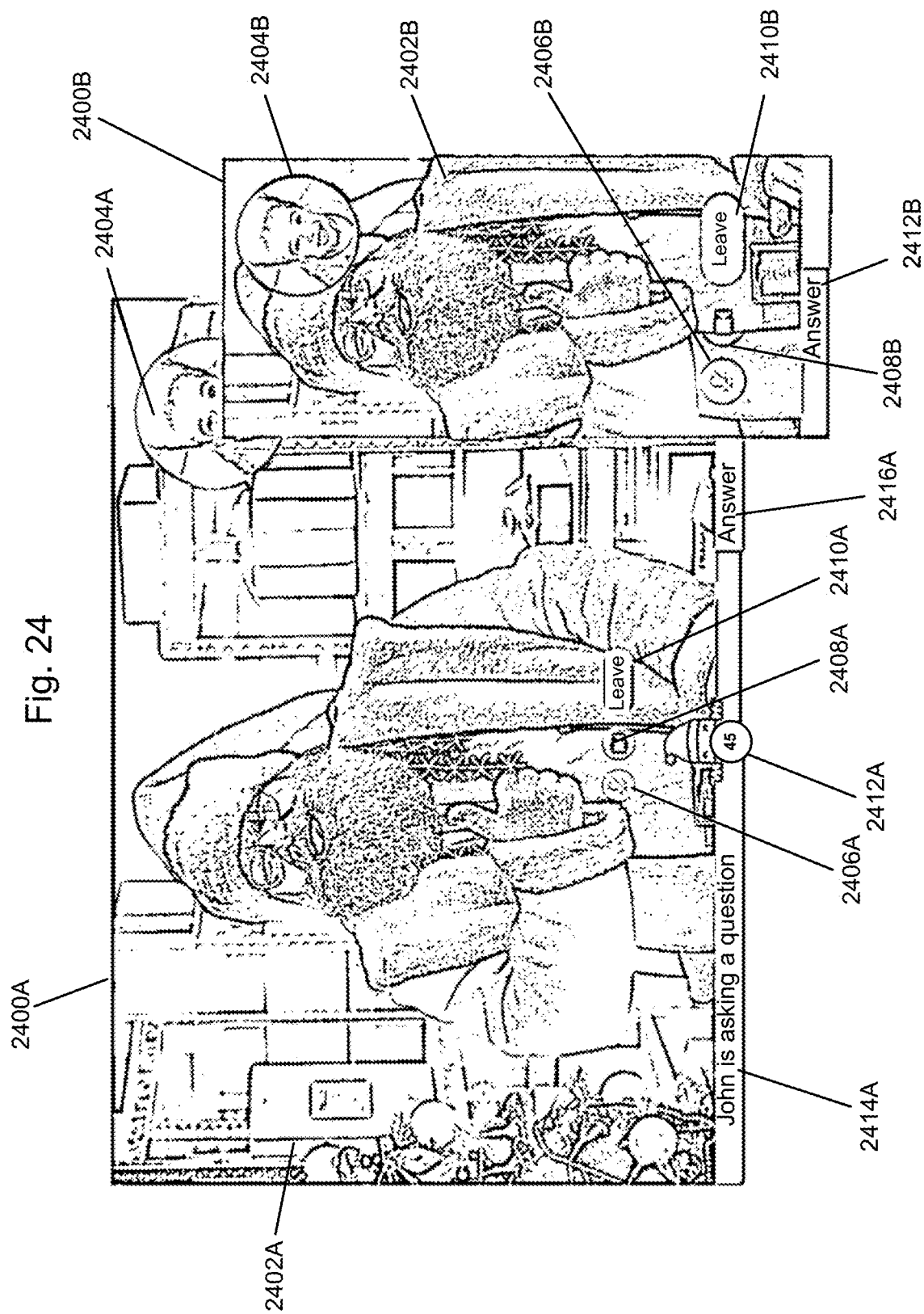

FIG. 24 presents an exemplary guest conference call interface according to an embodiment of the present invention. The guest conference call interface comprises a webpage 2400A and mobile application screen 2400B including a host video window 2402A and 2402B that displays a video stream along with an audio stream originating from the user device of the host. Guest video window 2404A and 2404B displays a video stream along with an audio stream originating from the user device of the guest. Microphone 2406A and 2406B may allow the guest to enable/disable an audio source (e.g., mute). Camera 2408A and 2408B may allow the guest to enable or disable their video feed. Leave button 2410A and 2410B may provide for interaction by the guest for signaling their respective termination of the timed one-on-one video conference call.

Timer ribbon 2412A and 2412B provide visual displays of a timer count up to a total length of time. The timer ribbon 2412A may be divided into a question portion 2414A and an answer portion 2416A. Timer ribbon 2412B may indicate whether it is in a question portion or the answer portion. While the timer ribbon 2412A is in the answer portion 2416A or the timer ribbon 2412 indicates an answer portion, the host video window 2402A may be sized to encompass the majority of the conference call interface while the guest video window 2404A may be sized to encompass a minority of the guest conference call interface.

The timer ribbon and other elements of the host and guest conference call interfaces may include customized branding, icons, and images corresponding to a theme (e.g., Christmas).

Figure 25:
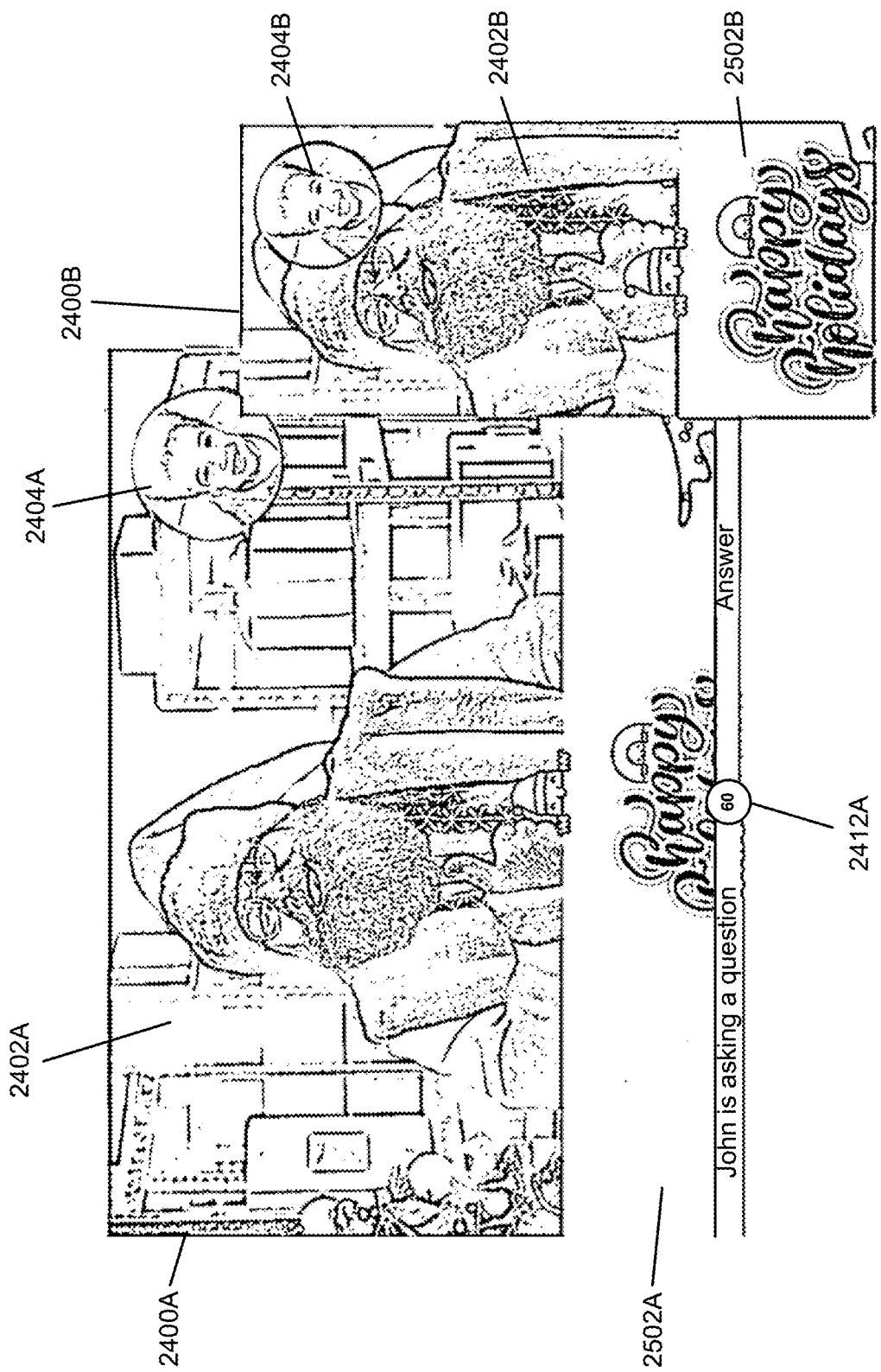

FIG. 25 presents an exemplary digital curtain within the guest conference call interface according to an embodiment of the present invention. Upon expiration of timer ribbon 2412A, digital curtain 2502A and 2502B begins a transition from a bottom portion of the guest conference call interface to a higher portion of the guest conference call interface. The transition may begin at the end of the answer portion of the timer ribbon 2412A. Along with the digital curtain 2502A and 2502B during the transition, a customizable themed music may be played to indicate an end to the timed one-on-one video conference call between the guest and the host.

Figure 26:
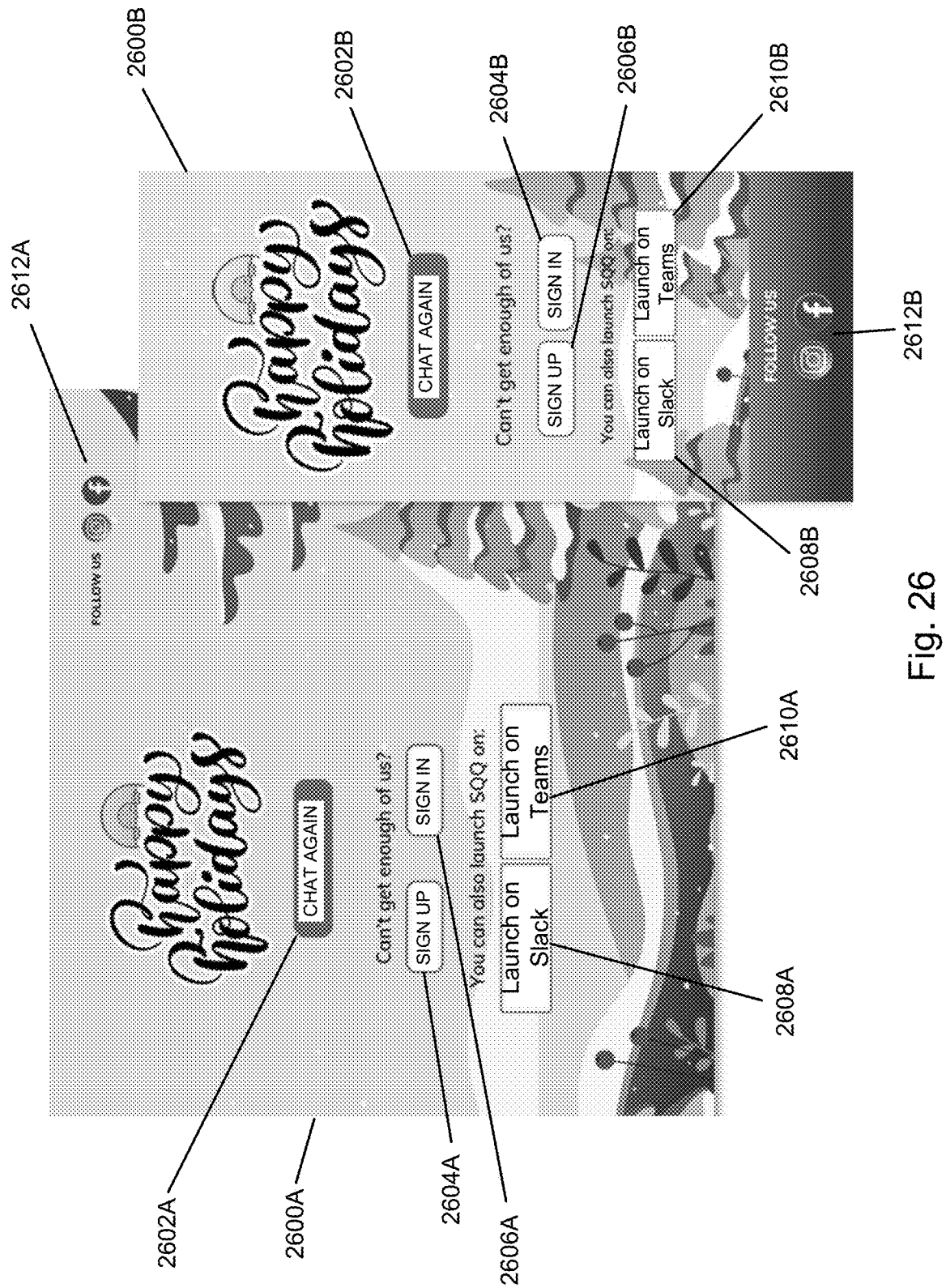

FIG. 26 presents closing messaging screens according to an embodiment of the present invention. Upon completion of the timed one-on-one video conference call, the guest may be presented with webpage 2600A and mobile application screen 2600B. The webpage 2600A and mobile application screen 2600B include chat again button 2602A and 2602B for allowing a guest to start a new timed one-on-one video conference call. Sign up button 2604A, 2604B and sign in button 2606A and 2606B may allow the guest to register to login to with an account to participate in other timed one-on-one video conference calls. Timed one-on-one video conference calls may be integrated with business communication platforms, such as Slack and Microsoft Teams, which may be downloaded via buttons 2608A, 2608B, 2610A, and 2610B. Social media links 2612A and 2612B direct the guest to social media platforms for a particular sponsor or company affiliated with the ended timed one-on-one video conference call.

Upon completion of the timed one-on-one video conference call the host may return to the webpage 1900 where the virtual queue in the message dialog 1902 is updated for the next guest and the sequence may be repeated until all guests are cleared in the queue.

Figure 27:
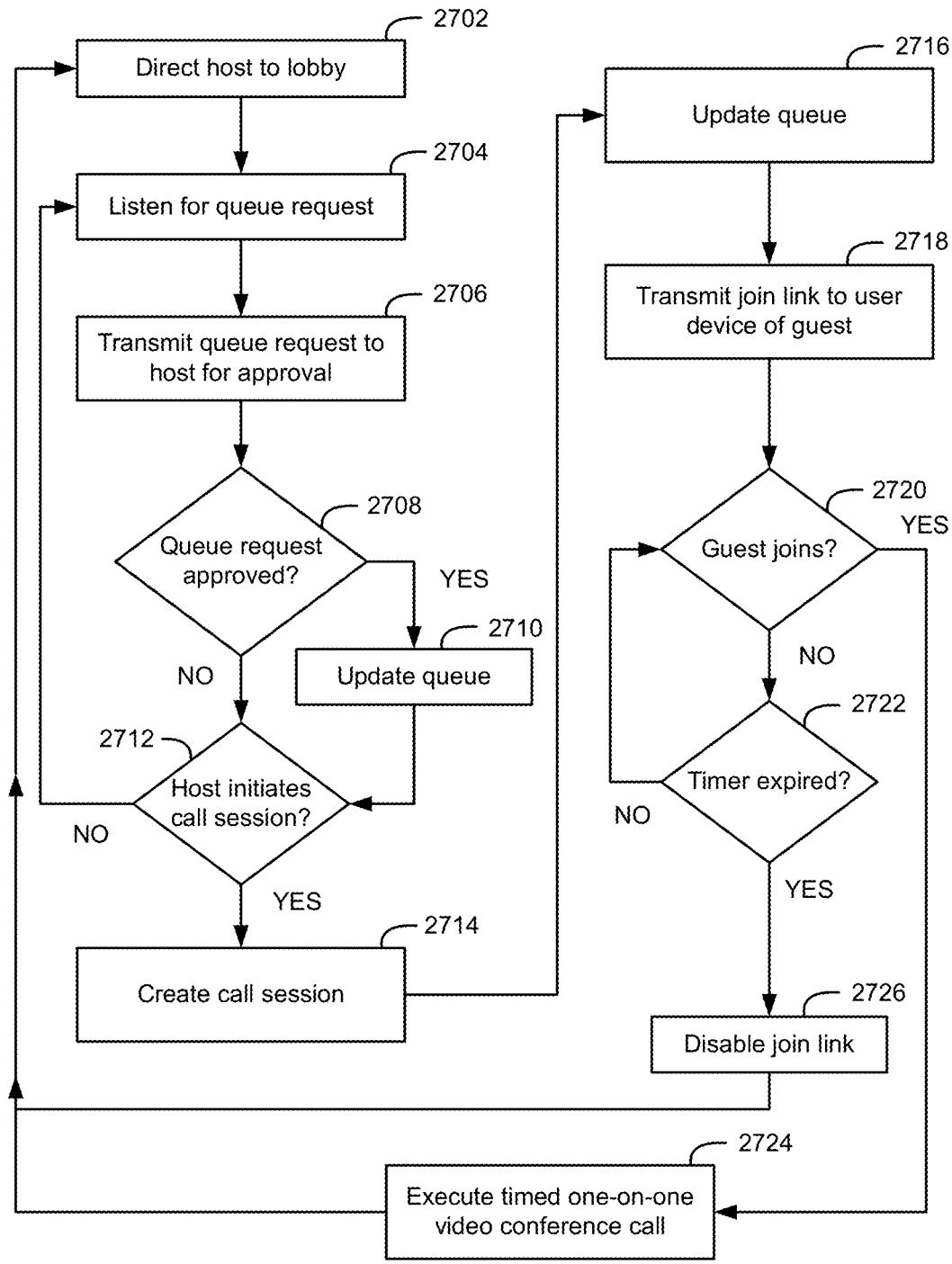
FIG. 27 illustrates a flowchart of a method for facilitating timed one-on-one video conference call sessions according to an embodiment of the present invention.

FIG. 27 illustrates a flowchart of a method for facilitating timed one-on-one video conference call sessions according to an embodiment of the present invention. A host may communicate with a communication server to create timed one-on-one video conference call sessions via queuing. A user device of the host is directed to a lobby interface by the communication server, step 2702. Directing the user device of the host to the lobby interface may include the communication server creating a queue for the host.

The communication server listens for a queue request, step 2704. A webpage or application interface may be created by the communication server to allow guests to schedule timed one-on-one video conference call sessions with the host via queue requests. Queue requests may comprise messages including a guest name or identifier, email address, and optionally a date and time block. A queue request from a user device of a guest may be received by the communication server. The communication server transmits the queue request to the host for approval, step 2706. The host may be presented with the queue request in the lobby interface for review. The communication server determines whether the queue request is approved by the host, step 2708. If the queue request is approved, the queue is updated with the queue request, step 2710. Updating the queue request may comprise adding the guest associated with the queue request to the queue in a first-in-first-out fashion. However, it is noted that other queuing methods may be employed.

The communication server proceeds to determine whether the host initiates a timed one-on-one video conference call session from the queue, step 2712 after updating the queue or if the queue request is not approved in 2708. The host initiating a timed one-on-one video conference call session from the queue may include receiving a selection of a guest from the queue.

If the host does not initiate a timed one-on-one video conference call session, the communication server continues to list for a queue request, step 2704. Otherwise, if the host initiates a timed one-on-one video conference call session, a timed one-on-one video conference call session is created between the selected guest and the host, step 2714. The queue is updated by removing the selected guest from the queue, step 2716.

A join link is transmitted to the user device of the selected guest, step 2718. The guest may be given a predetermined amount of time to join the timed one-on-one video conference call session. A timer to join the timed one-on-one video conference call session may be started. The communication server listens for a join response to the link from the guest, step 2720. If not, the communication server determines whether the timer has expired, step 2722. The communication server continues to listen for the join response until expiration of the timer, then of which, the join link is disabled, step 2726, and the host is directed back to the lobby.

If the communication server receives a join response to the link from the guest before expiration of the timer, instructions for carrying out the timed one-on-one video conference call session are executed, step 2724. The instructions may include retrieving video and audio streams from the user device of the host and the user device of the guest and presenting the retrieved video and audio streams to the host and guest. The timed one-on-one video conference call session may terminate upon host or guest command or upon an expiration of a timer ribbon, as disclosed herewith. Upon termination of the timed one-on-one video conference call session, the host is directed back to the lobby at step 2702.

Figure 28:
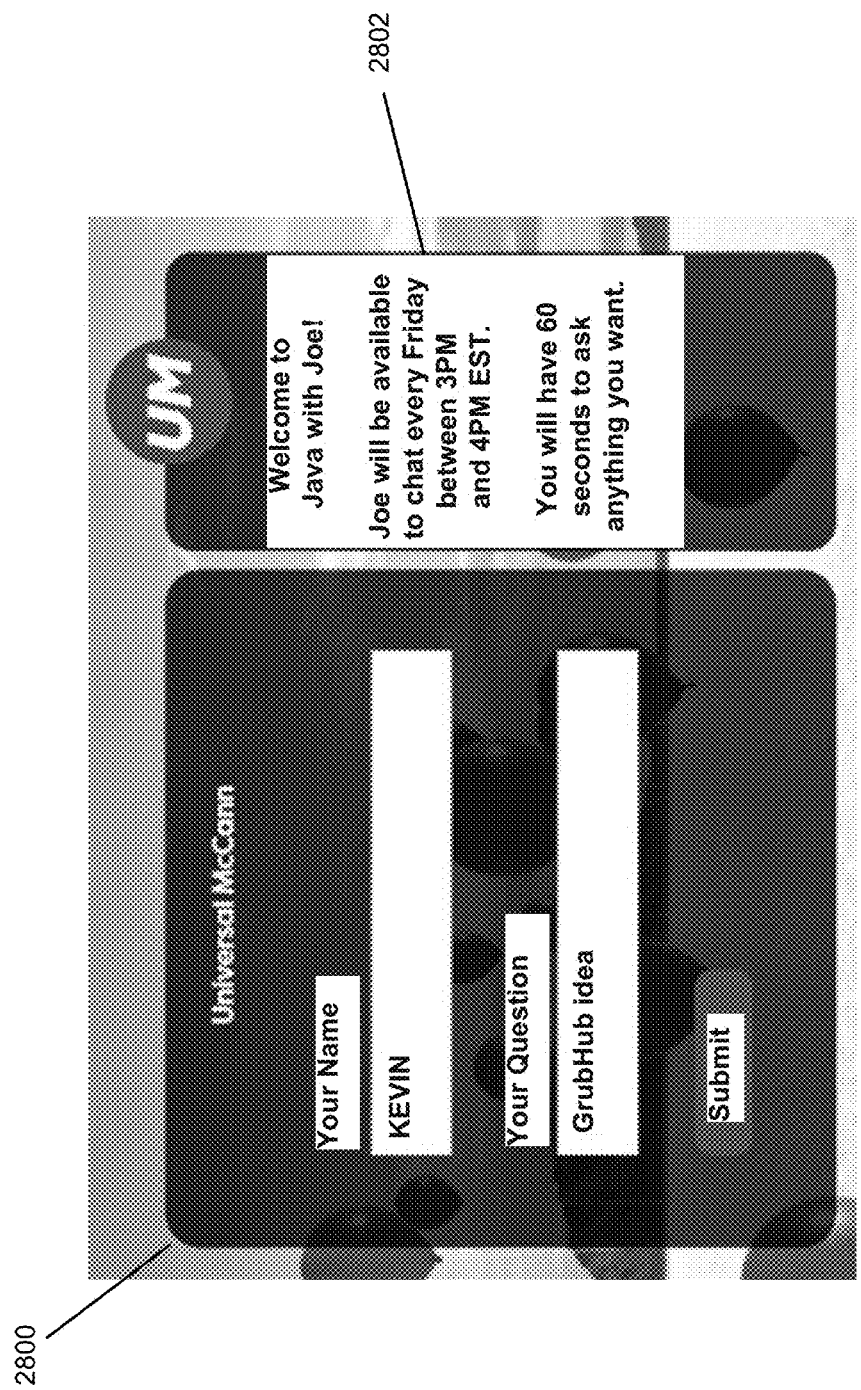
FIGS. 28-30 illustrate interfaces for allowing a guest to join a timed one-on-one video conference call according to some embodiments of the present invention.
Figure 29:
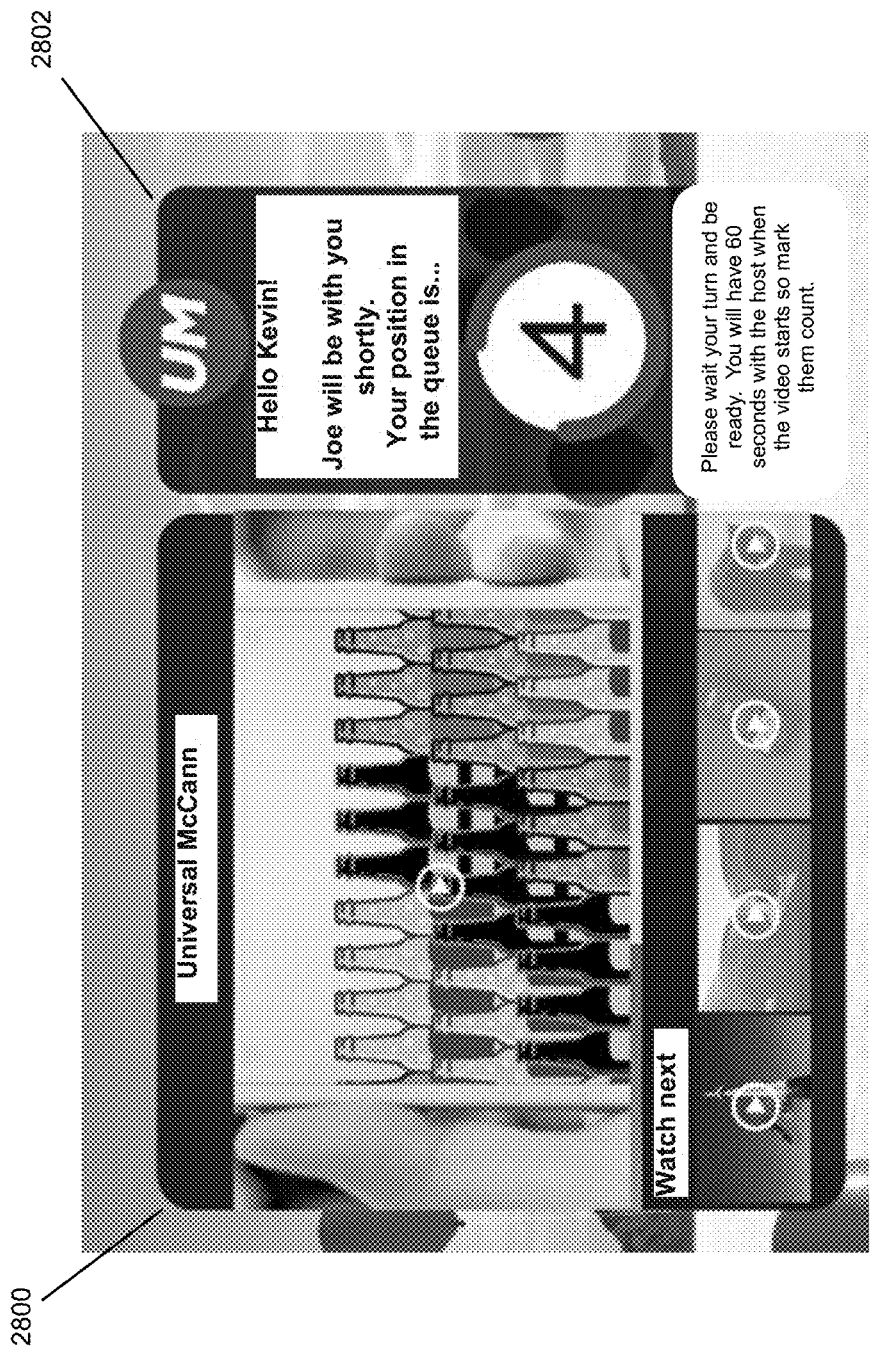
Figure 30:
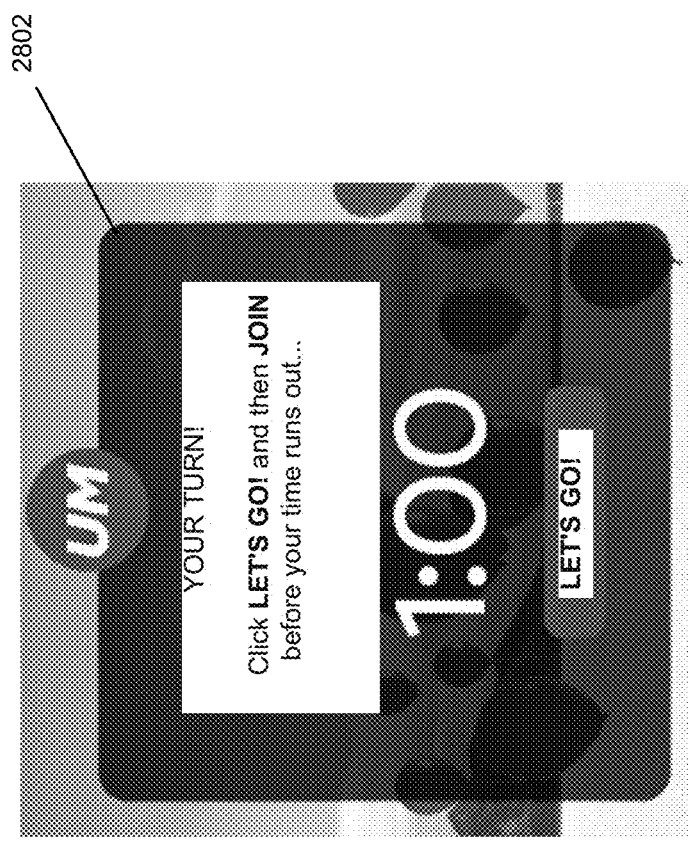

FIGS. 28 through 30 present exemplary interfaces for allowing a guest to join a timed one-on-one video conference call according to another embodiment of the present invention. The interface presented in FIG. 28 may be generated by a communication server and presented to a guest on a client device for participating in a timed one-on-one video conference call created by a host. The guest may access the interface via a link or entering unique identifier specifying a particular timed one-on-one video conference call. The interface may include a request window 2800 and an information window 2802. The request window 2800 may include fields for a guest to enter their name along with a question or topic. Information window 2802 may include information, such as a welcome message, time/day availability, and parameters of the timed one-on-one video conference call.

Information entered into the fields of request window 2800 may be submitted to the communication server hosting the timed one-on-one video conference call. The guest may be entered into a queue for the timed one-on-one video conference call with the host. The queue for the timed one-on-one video conference call may include a plurality of positions or time slots that can be reserved by guests on a first-come-first-serve basis. Each position or time slot in the queue may correspond to a given portion of a timed one-on-one video conference call session that a guest is allowed to participate in with the host. Accordingly, the queue may control and determine which guest may join the timed one-on-one video conference call session with the host.

After submitting the information via the request window 2800, the request window 2800 is instructed by the communication server to transition to video advertisements, as shown by FIG. 29. The communication server also updates the information window 2802 to confirm submission of information previously entered in the request window 2800 and informs the guest of their position in queue status. The video advertisements may remain in the request window 2800 while the guest waits for their turn in the queue. Video advertisements in request window 2800 may automatically play in a playlist or manually selected.

When the guest has reached the top of the queue, they may be notified in information 2802 (shown in FIG. 30) and provided with a button to join the timed one-on-one video conference call with the host. The guest may be given a predetermined amount of time (e.g., one minute) to join the timed one-on-one video conference call before timing out and taken off the queue.

Figure 31:
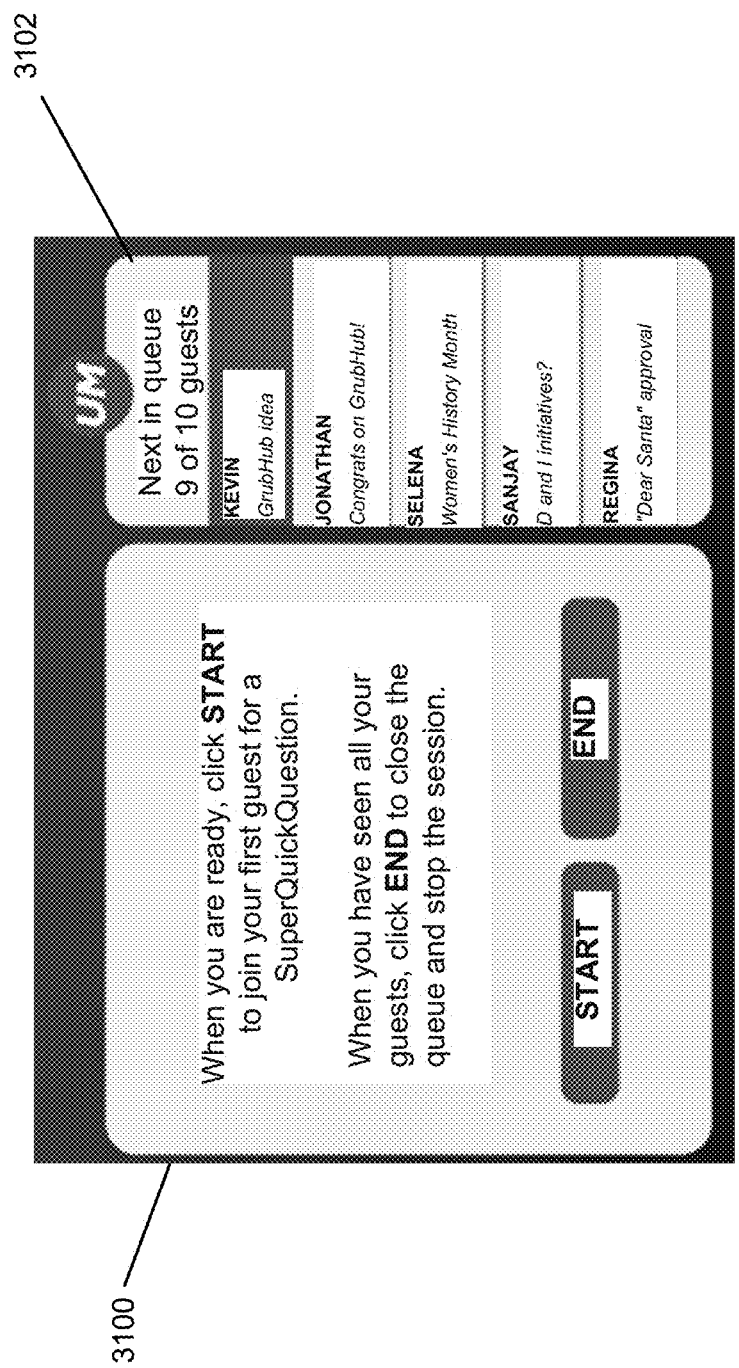
FIGS. 31 through 33 present exemplary interfaces for allowing a host to manage guests for a timed one-on-one video conference call according to another embodiment of the present invention.
Figure 32:
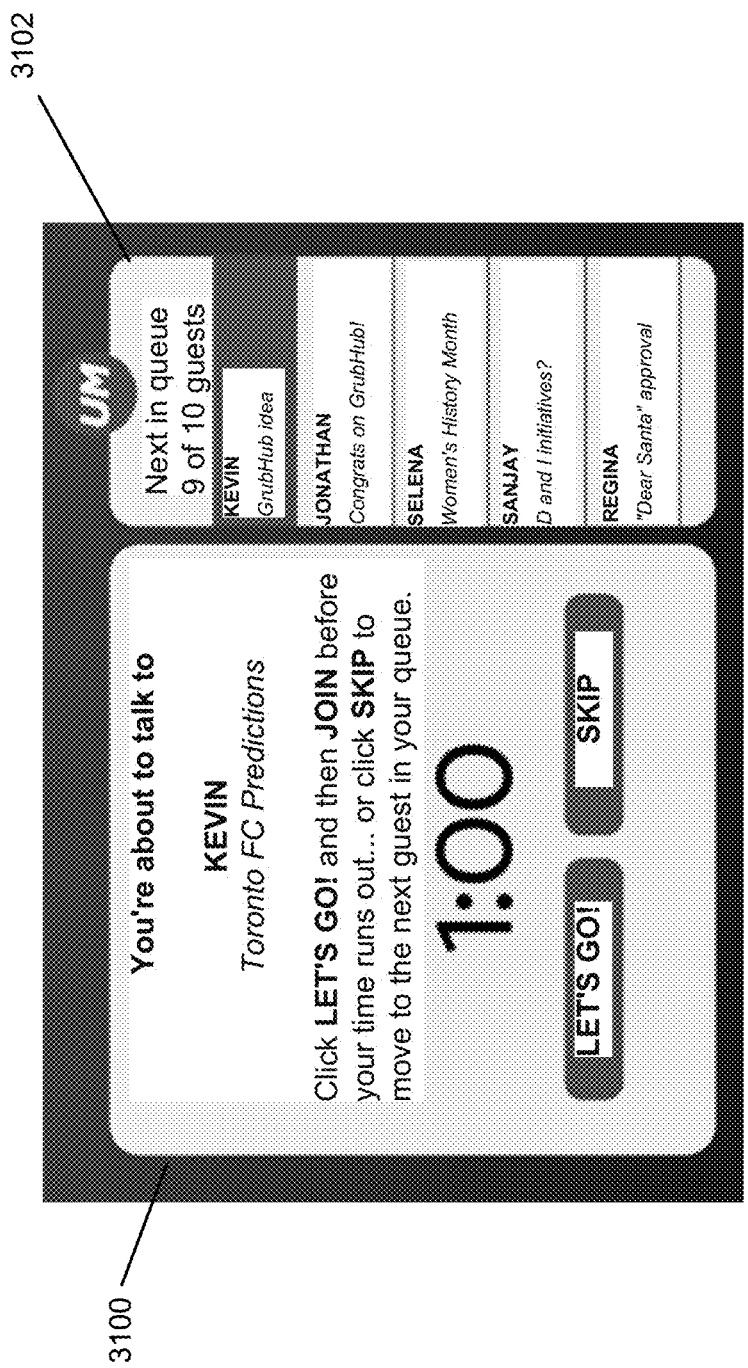
Figure 33:
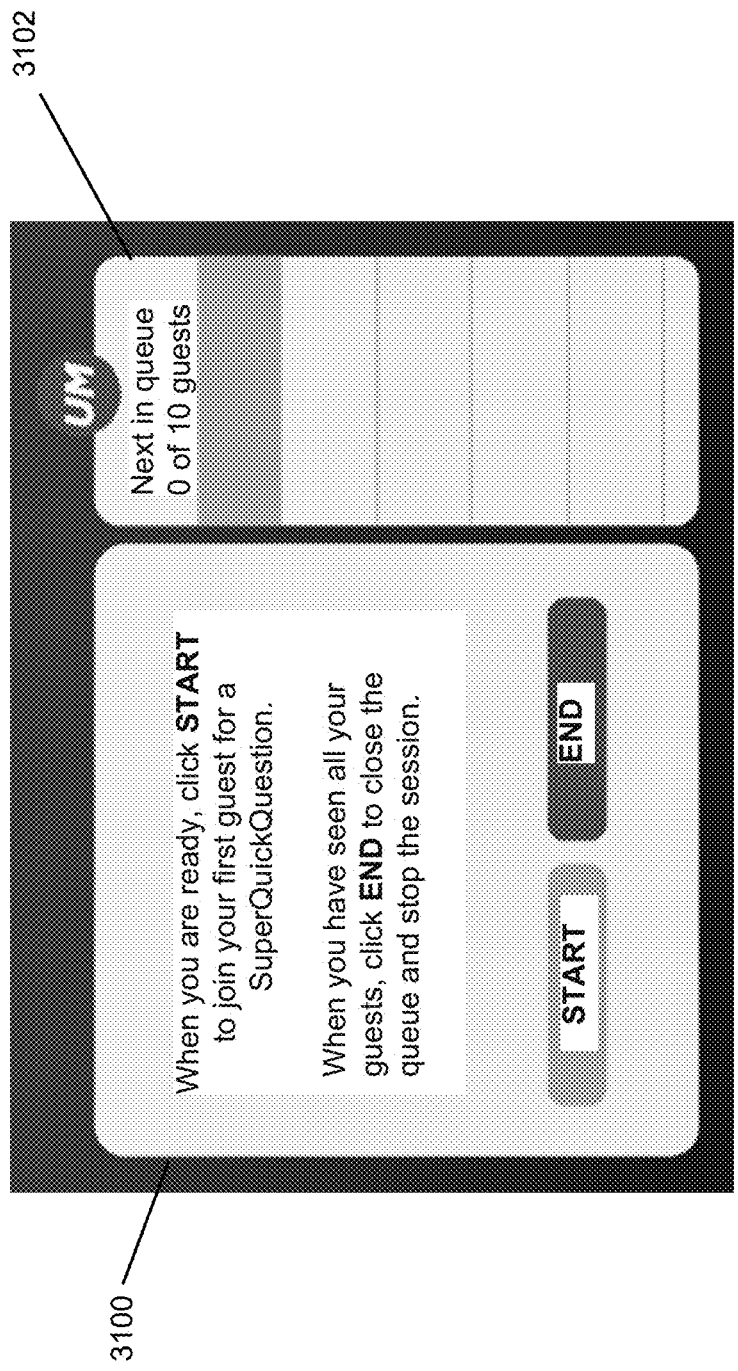

FIGS. 31 through 33 present exemplary interfaces for allowing a host to manage guests for a timed one-on-one video conference call according to another embodiment of the present invention. The interface presented in FIG. 31 may be generated by a communication server and presented to a host on a client device for allowing guests to participate in a timed one-on-one video conference call session with the host. The interface may include a session window 3100 and a queue 3102. Queue 3102 may include a plurality of slots each of which may indicate a guest's name along with a question or topic (e.g., entered via request window 2800 in FIG. 28). The session window 3100 may include a button for joining a guest at the top of queue 3102 in a timed one-on-one video conference call.

A timer may be presented in the session window 3100 to indicate an amount of time the host has to join the guest at the top of queue 3102 in the timed one-on-one video conference call, as shown in FIG. 32. The host may also skip over guests in queue 3102. The session window 3100 may also allow the host to end the timed one-on-one video conference call session at any time or when there are no more guests on the queue 3102 (FIG. 33).

FIGS. 1 through 33 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for facilitating a sequence of timed video conference calls for a host, wherein the system is configured to establish and receive communications via a communications network between the host on a first user device and one or more guests on one or more second user devices, the system comprising:
   a communication server communicatively connected with the first user device and the one or more second user devices;
   a memory device accessible to the communication server, the memory device storing queue data representing a queue of two or more guests scheduled for the sequence of timed video conference calls with the host including an order for the two or more guests to have the sequence of timed video conference calls with the host; and
   a server side application implemented on the communication server for initiating the sequence of timed video conference calls between the first user device and the one or more second user devices by connecting video and audio streams received from the first user device and the one or more second user devices, the server side application initiating a first timed video conference call according to the queue data, ending the first timed video conference call after a preset length of time, and establishing a second timed video conference call at the end of the first timed video conference call according to an order in the queue data;
   wherein the server side application shares a call interface with the host and the one or more guests, wherein the shared call interface displays a timer configured to count the preset length of time for each of the sequence of timed video conference calls and an indicator for a next one of the one or more guests in the queue to join a given timed video conference call.

2. The system of claim 1, wherein before joining the timed video conference calls, the one or more guests register to join the queue by entering personal information including their name or email address.

3. The system of claim 2, wherein once registered, the one or more guests are added to the queue and can view a guest queuing interface including an indicator showing the one or more guests' position in the queue and a timer indicator configured to count down the time until it's the one or more guests' turn in the queue.

4. The system of claim 1, wherein the memory device includes a database of records associated with the timed video conference calls, including the queue data.

5. The system of claim 1, wherein a first guest based on the order of the queue is admitted into the first timed video conference call with the host.

6. The system of claim 1, wherein the second timed video conference call is initiated when the first timed video conference call terminates, wherein a second guest based on the order of the queue is admitted into the second timed video conference call with the host.

7. The system of claim 1, wherein the sequence of timed video conference calls includes any number of timed video conference calls to admit any number of guests based on the order of the queue.

8. The system of claim 1, wherein the timer is configured to count from zero to the preset total length of time for each of the timed video conference calls.

9. The system of claim 1, wherein each of the timed video conference calls of the sequence of timed video conference calls is terminated when the timer reaches the present length of time.

10. The system of claim 1, wherein the queue for the sequence of timed video conference call is created by the host.

11. The system of claim 1, wherein the host sends a request, via the communications network, to initiate the sequence of timed video conference calls with the one or more guests, the request comprising a message including a configuration for the queue.

12. The system of claim 11, wherein the host sends an invitation link, via the communications network, to the one or more guests to participate in the sequence of timed video conference calls initiated in response to the request sent by the host.

13. The system of claim 12, wherein when the one or more guests accept the invitation from the host, a shared lobby interface is shared via the communications network with the host and the one or more guests, the shared lobby interface including a join button.

14. The system of claim 13, wherein interaction with the join button by the host and the one or more guests causes the communication server to transmit the shared call interface to the host and the one or more guests based on the order of the queue.

15. The system of claim 1, wherein the queue comprises a data structure storing time blocks for the one or more guests.

16. The system of claim 15, wherein the time blocks are assigned to the one or more guests by the host.

17. The system of claim 15, wherein the time blocks are selected by the one or more guests.

18. The system of claim 15, wherein the queue includes time increments for generating the time blocks based on a total number of guests or a total number of desired questions.

19. The system of claim 15, wherein the queue includes a private queue configured to allow the host and a first guest of the one or more guests, based on the order of the queue, to participate in and view the timed video conference call at a first time block, wherein a second guest of the one or more guests, based on the order of the queue, participates in a second time block consecutively after the first time block, and so on, until all of the one or more guests have participated in the timed video conference call with the host during a given time block in the order set by the queue.

20. The system of claim 15, wherein the queue includes a public queue configured to allow the host and a plurality of guests to view an entirety of the timed video conference call, wherein a first guest of the plurality of guests, based on the order of the queue, is allowed to speak with the host during a first time block, wherein a second guest of the plurality of guests, based on the order of the queue, is allowed to speak with the host during a second time block consecutively after the first time block, and so on, until all of the plurality of guests have spoken with the host during the timed video conference call in the order set by the queue.

21. The system of claim 1, wherein the sequence of timed video conference calls is configured to be implemented into a third-party platform or website.

22. The system of claim 21, wherein the third-party platform or website includes one of a sports betting website, a dating website, a financial services platform, an education technology platform, or a retail brand website.

23. A computer implemented method for facilitating a sequence of timed video conference calls, the method comprising:
receiving over a communication network a request from a host on a first user device to initiate the sequence of timed video conference calls with one or more guests on one or more second user devices, the request comprising a message including a configuration for a queue, wherein the queue determines an order for the one or more guests to speak to the host during the sequence of timed video conference calls;
initiating a first timed video conference call within the sequence of timed video conference calls, including streamed video and audio between the host on the first user device and a first guest of the one or more guests on the one or more second user devices, based on the order of the queue, for a preset length of time;
sharing a call interface on the first user device and the one or more second user devices displaying a timer configured to count to the preset length of time and an indicator for a next one of the one or more guests in the queue to join a given timed video conference call;
terminating the first timed video conference call when the preset length of time is reached; and
initiating a second timed video conference call within the sequence of timed video conference calls upon termination of the first timed video conference call, including streamed video and audio between the host on the first user device and a second guest of the one or more guests on the one or more second user devices, based on the order of the queue, for the preset length of time.

24. The method of claim 23, further including transmitting over the communication network to the one or more guests an invitation link to participate in the sequence of timed video conference calls.

25. The method of claim 23, further including terminating the second timed video conference call when the preset length of time is reached.

26. The method of claim 23, further including initiating any number of timed video conference calls consecutively after the first and second timed video conference calls to accommodate any number of guests.

27. The method of claim 26, wherein each of the timed video conference calls is terminated when the timer reaches the present length of time.

28. The method of claim 23, wherein the queue comprises a data structure storing time blocks for each video conference call of the sequence of timed video conference calls.

29. The method of claim 28, wherein the time blocks are assigned to the one or more guests by the host.

30. The method of claim 28 wherein the time blocks are selected by the one or more guests.

31. The method of claim 28, wherein the queue includes time increments for generating the time blocks based on a total number of guests or desired questions.

* * * * *